(12) United States Patent
Brancale et al.

(10) Patent No.: US 12,503,448 B2
(45) Date of Patent: Dec. 23, 2025

(54) ANTIBACTERIAL AND ANTIPARASITIC QUINOXALINE-2,3-DIAMINE DERIVATIVES

(71) Applicants: University College Cardiff Consultants Limited, Cardiff (GB); Aberystwyth University, Aberystwyth (GB)

(72) Inventors: Andrea Brancale, Cardiff (GB); Gilda Padalino, Aberystwyth (GB); Karl Hoffman, Aberystwyth (GB)

(73) Assignees: University College Cardiff Consultants Limited, Cardiff (GB); Aberystwyth University, Aberystwyth (GB)

( * ) Notice: Subject to any disclaimer, the term of this patent is extended or adjusted under 35 U.S.C. 154(b) by 879 days.

(21) Appl. No.: 17/620,670

(22) PCT Filed: Jul. 3, 2020

(86) PCT No.: PCT/GB2020/051610
§ 371 (c)(1),
(2) Date: Dec. 17, 2021

(87) PCT Pub. No.: WO2021/001661
PCT Pub. Date: Jan. 7, 2021

(65) Prior Publication Data
US 2022/0259159 A1   Aug. 18, 2022

(30) Foreign Application Priority Data
Jul. 4, 2019   (GB) ..................... 1909659

(51) Int. Cl.
| | |
|---|---|
| *C07D 241/44* | (2006.01) |
| *A61K 45/06* | (2006.01) |
| *A61P 31/04* | (2006.01) |
| *A61P 33/06* | (2006.01) |
| *A61P 33/12* | (2006.01) |
| *C07D 339/08* | (2006.01) |
| *C07D 405/12* | (2006.01) |

(52) U.S. Cl.
CPC ............ *C07D 241/44* (2013.01); *A61K 45/06* (2013.01); *A61P 31/04* (2018.01); *A61P 33/06* (2018.01); *A61P 33/12* (2018.01); *C07D 339/08* (2013.01); *C07D 405/12* (2013.01)

(58) Field of Classification Search
CPC ..... C07D 241/44; C07D 339/08; A61P 31/04; A61P 33/06; A61P 33/12; A61K 31/382; A61K 31/498; Y02A 50/30
See application file for complete search history.

(56) References Cited

FOREIGN PATENT DOCUMENTS

| BR | 102013030329 A2 | 10/2015 |
|---|---|---|
| CN | 103122364 A | 5/2013 |
| CN | 104622873 A | 5/2015 |
| WO | 02/20463 A2 | 3/2002 |
| WO | 2015164850 A1 | 10/2015 |
| WO | 2016168536 A1 | 10/2016 |

OTHER PUBLICATIONS

D.G. Colley, S.K. Wikel, "Schistosoma mansoni: simplified method for the production of schistosomules", Exp. Parasitol. 35 (1974), pp. 44-51.
M. Nur-e-alam, M. Yousaf, S. Ahmed, E.S. Al-sheddi, I. Parveen, D.M. Fazakerley, A. Bari, H.A. Ghabbour, M.D. Threadgill, K.C.L. Whatley, K.F. Ho, A.J. Al-rehaily, "Neoclerodane Diterpenoids from Reehal Fatima, Teucrium yemense", J. Nat. Prod. 80 (2017) pp. 1900-1908.
Paveley, R., Mansour, N., Halyburton, I., Bleicher, L., Alex, E., Mikic, I., Guidi, A., H Gilbert, I., L Hopkins, A., D Bickle, Q., in "Whole Organism High-Content Screening by Label-Free, Image-Based Bayesian Classification for Parasitic Diseases", PLoS Negl Trop Dis 6(7) (2012), pp. 1-11.
Padalino G, Ferla S, Brancale A, Chalmers IW, Hoffmann KF. Int J "Parasitol Drugs Drug Resist". Dec. 2018; 8(3), pp. 559-570.
Whiteland HL, Chakroborty A, Forde-Thomas JE, Crusco A, Cookson A, Hollinshead J, Fenn CA, Bartholomew B, Holdsworth PA, Fisher M, Nash RJ, Hoffmann KF. "Int J Parasitol Drugs Drug Resist" Dec. 2018; pp. 465-474.
Crusco A, Bordoni C, Chakroborty A, Whatley KCL, Whiteland H, Westwell AD, Hoffmann KF. "Design, synthesis and anthelmintic activity of 7-keto-sempervirol analogues" Eur J Med Chem. May 25, 2018, pp. 87-100.
Ramirez, B., Bickle, Q., Yousif, F., Fakorede, F., Mouries, M.-A., Nwaka, S. in Schistosomes: Challenges in compound screening, Expert Opin Drug Discov. Oct. 2007;2(s1), pp. S53-S61.
Marcellino C., Gut, J., Lim, K., Singh R., McKerrow, L. and Sakanari, J. WormAssay: "A novel computer application for whole-plate motion-based screening of macroscopic parasites". Jan. 2012. pp. 1-9.

(Continued)

Primary Examiner — Sahar Javanmard
(74) Attorney, Agent, or Firm — John S. Sears; Lex Generalis, LLC

(57) ABSTRACT

A compound of formula (I), or a pharmaceutically acceptable salt or solvate thereof, for use in the treatment of a patient infected with pathogenic organisms; wherein X and Y are each independently selected from C, N, O and S, provided at least one of X and Y is N, O or S; wherein $R^1$ and $R^2$ are each independently selected from an optionally substituted $C_1$-$C_8$ alkyl, $C_1$-$C_8$ alkenyl, aryl, heteroaryl or alkylaryl group; and wherein Z is selected from H, —CN, —$NO_2$, —$NR^3R^4$, —$NR^5(CO)R^6$; $C_1$-$C_4$ alkyl, $C_1$-$C_4$ alkoxy, —(CO)$WR^{12}$, hydroxy, amino, thiol, chloro, fluoro, $CF_3$, $CHF_2$ or $CH_2F$ groups. The compounds may be effective in treating patients/animals infected with parasites selected from *Schistosoma, Haemonchus, Eimeria, Echinococcus, Dirofilaria, Fasciola* or *Plasmodium* parasites. Additionally or alternatively, the compounds of formula (I) may be effective in treating patients infected with pathogenic bacteria selected from *S. aureus*, MRSA and *Enterococcus faecalis*.

13 Claims, 7 Drawing Sheets
Specification includes a Sequence Listing.

(56) References Cited

OTHER PUBLICATIONS

Geyer KK, Munshi SE, Whiteland HL, Fernandez-Fuentes N, Phillips DW, Hoffmann KF. "Methyl-CpG-binding (SmMBD2/3) and chromobox (SmCBX) proteins are required for neoblast proliferation and oviposition in the parasitic blood fluke Schistosoma mansoni" PLoS Pathog. Jun. 28, 2018; 14(6):e1007107, pp. 1-27.
Dixon et al. and Wilson et al (Dixon, K.E. "The physiology of excystment of the metacercaria of *Fasciola hepática* L." Parasitology, 1966, 56, pp. 431-456.
Wilson, L.R., Good, R.T., Panaccio, M., Wijffels, G.L., Sandeman, R.M., Spithill, T.W, "Fasciola hepatica: Characterization and Cloning of the Major Cathepsin B Protease Secreted by Newly Excysted Juvenile Liver Fluke". Experimental Parasitology 1998, 88, pp. 85-94.
Edwards, J., Brown, M., Peak, E., Bartholomew, B., Nash, R.J., Hoffmann, K.F., "The diterpenoid 7-keto-sempervirol, derived from Lycium chinense, displays anthelmintic activity against both Schistosoma mansoni and Fasciola hepatica", PLoS neglected tropical diseases 2015, 9, e0003604-e0003604, pp. 1-19.
Baptista, Rafael, Fazakerley, David M., Beckmann, Manfred, Baillie, Les and Mur, Luis A. J. 2018. "Untargeted metabolomics reveals a new mode of action of pretomanid (PA-824)" Scientific Reports 8 (1), 2018, pp. 1-7.
Smithers S, Terry R. "The infection of laboratory hosts with cercariae of Schistosoma mansoni and the recovery of the adult worms" Parasitology 1965, pp. 695-700.
Crusco A, Whiteland H, Baptista R, Forde-Thomas JE, Beckmann M, Mur LAJ, et al. "Antischistosomal Properties of Sclareol and Its Heck-Coupled Derivatives: Design, Synthesis, Biological Evaluation, and Untargeted Metabolomics". ACS Infectious Diseases. 2019, pp. 1188-1199.
Whatley KCL, Padalino G, Whiteland H, Geyer KK, Hulme BJ, Chalmers IW, et al. "The repositioning of epigenetic probes/inhibitors identifies new anti-schistosomal lead compounds and chemotherapeutic targets". PLOS Neglected Tropical Diseases. 2019, pp. 1-24.
Anonymous. "232071-002/RN" << STN Registry>> Jul. 19, 2023. pp. 1-103.
Kher et al., "Quinoxaline-based inhibitors of malarial protease PfSUB1," Chemistry of Heterocyclic Compounds, vol. 50, No. 10. 2014. pp. 1583-1589.
Khan S A et al: "Synthesis and Antimicrobial Activity of 2,2-Di-Substituted Quinoxalines", Indian Journal of Heterocyclic Chemistry, National Academy of Chemistry and Biology, In., vol. 18, No. 2, Dec. 31, 2008, pp. 197-198.
Adelaide U. P. Hain et al: "Identification of an Atg8-Atg3 Protein-Protein Interaction Inhibitor from the Medicines for Malaria Venture Malaria Box Active in Blood and Liver Stage Plasmodium falciparum Parasites", Journal of Medicinal Chemistry, vol. 57, No. 11, Jun. 12, 2014, pp. 4521-4531.
Annie N. Cowell et al: "Mapping the malaria parasite druggable genome by using in vitro evolution and chemogenomics", Science, vol. 359, No. 6372, Jan. 12, 2018, pp. 191-199.
Katrin Ingram-Sieber et al: "Orally Active Antischistosomal Early Leads Identified from the Open Access Malaria Box", PLOS Neglected Tropical Diseases, vol. 8, No. 1, Jan. 9, 2014, pp. 1-9.
Waisser et al: "Antimycobacterial activity of some 2,3-dianilinoquinoxaline derivatives with substituents in position 6", Scientia Pharmaceutica, vol. 65, No. 3, 1997, pp. 109-112.
Waisser et al: "Antimycobacterial activity of some 2,3 dianilinoquinoxaline derivatives", Pharmazie, vol. 52, No. 10, 1997, pp. 797-798.
Eubanks et al: "In silico screening and evaluation of Plasmodium falciparum protein kinase 5 (PK5) inhibitors", Chemmedchem, vol. 13, No. 23, 2018, pp. 2479-2483.

SEQUENCE LISTING

```
<160> NUMBER OF SEQ ID NOS: 8

<210> SEQ ID NO 1
<211> LENGTH: 21
<212> TYPE: RNA
<213> ORGANISM: Artificial sequence
<220> FEATURE:
<223> OTHER INFORMATION: Part of smp_138030 siRNA duplex
<220> FEATURE:
<221> NAME/KEY: misc_feature
<222> LOCATION: (20)..(21)
<223> OTHER INFORMATION: n is deoxythymidine

<400> SEQUENCE: 1
cguuuggucc caucggacan n                                             21

<210> SEQ ID NO 2
<211> LENGTH: 21
<212> TYPE: RNA
<213> ORGANISM: Artificial Sequence
<220> FEATURE:
<223> OTHER INFORMATION: Part of smp_138030 siRNA duplex
<220> FEATURE:
<221> NAME/KEY: misc_feature
<222> LOCATION: (20)..(21)
<223> OTHER INFORMATION: n is deoxythymidine

<400> SEQUENCE: 2
uguccgaugg gaccaaacgn n                                             21

<210> SEQ ID NO 3
<211> LENGTH: 21
<212> TYPE: RNA
<213> ORGANISM: Artificial sequence
```

```
<220> FEATURE:
<223> OTHER INFORMATION: Part of non-specific Luciferase siRNA duplex
<220> FEATURE:
<221> NAME/KEY: misc_feature
<222> LOCATION: (20)..(21)
<223> OTHER INFORMATION: n is deoxythymidine

<400> SEQUENCE: 3
cuuacgcuga guacuucgan n                                                  21

<210> SEQ ID NO 4
<211> LENGTH: 21
<212> TYPE: RNA
<213> ORGANISM: Artificial sequence
<220> FEATURE:
<223> OTHER INFORMATION: Part of non-specific Luciferase siRNA duplex
<220> FEATURE:
<221> NAME/KEY: misc_feature
<222> LOCATION: (20)..(21)
<223> OTHER INFORMATION: n is deoxythymidine

<400> SEQUENCE: 4
ucgaaguacu cagcguaagn n                                                  21

<210> SEQ ID NO 5
<211> LENGTH: 19
<212> TYPE: DNA
<213> ORGANISM: Artificial sequence
<220> FEATURE:
<223> OTHER INFORMATION: qRT-PCR forward primer for smp_138030

<400> SEQUENCE: 5
gtctaccggg tgttcgacg                                                     19

<210> SEQ ID NO 6
<211> LENGTH: 17
<212> TYPE: DNA
<213> ORGANISM: Artificial sequence
<220> FEATURE:
<223> OTHER INFORMATION: qRT-PCR reverse primer for smp_138030

<400> SEQUENCE: 6
tccaaatccc gtgcagc                                                       17

<210> SEQ ID NO 7
<211> LENGTH: 22
<212> TYPE: DNA
<213> ORGANISM: Artificial sequence
<220> FEATURE:
<223> OTHER INFORMATION: qRT-PCR forward primer for alpha tubulin SmAT1

<400> SEQUENCE: 7
cgaagcttgg gcgcgtctag at                                                 22

<210> SEQ ID NO 8
<211> LENGTH: 22
<212> TYPE: DNA
<213> ORGANISM: Artificial sequence
<220> FEATURE:
<223> OTHER INFORMATION: qRT-PCR reverse primer for alpha tubulin SmAT1

<400> SEQUENCE: 8
ctaatactct tcaccttccc ct                                                 22
```

ANTIBACTERIAL AND ANTIPARASITIC QUINOXALINE-2,3-DIAMINE DERIVATIVES

CROSS-REFERENCE TO RELATED APPLICATIONS

This application is the 35 U.S.C. § 371 national stage application of PCT Application No. PCT/GB2020/051610, filed Jul. 3, 2020, where the PCT claims priority to, and the benefit of, the United Kingdom Application No. 1909659.3, filed Jul. 4, 2019, both of which are herein incorporated by reference in their entireties.

REFERENCE TO SEQUENCE LISTING

The Sequence Listing submitted Dec. 17, 2021, as a text file named "SequenceListing.txt," created on Dec. 17, 2021, and having a size of 375 bytes is hereby incorporated by reference.

FIELD

The present invention relates to compounds for use in treating patients infected with pathogenic organisms. In particular, the present invention relates to compounds useful in the treatment of parasitic and bacterial infections in humans and animals.

BACKGROUND

Pathogenic organisms such as parasites (e.g. multi-cellular worms and single cell protozoans) and bacteria present a huge risk to public health, particularly in the developing world. For example, several billion people are considered to live with or at risk of parasitic diseases. A particularly problematic parasitic disease is schistosomiasis caused by infection with parasitic flatworms called schistosomes, which is considered by the World Health Organization to be the second-most socioeconomically devastating parasitic human disease, after malaria. *Schistosoma haematobium*, *Schistosoma japonicum* and *Schistosoma mansoni* are the most prevalent and problematic schistosome species, responsible for a major proportion of schistosomiasis cases.

Current schistosomiasis treatments and control efforts rely on the treatment of at-risk populations with praziquantel, which remains the only drug available for combatting schistosomiasis. Whilst praziquantel has good efficacy and tolerability, it is not effective against the juvenile form of schistosomes. The reliance on a single drug for treating such a widespread disease also risks the development of drug resistance in these organisms.

Unfortunately, due to schistosomiasis disproportionately affecting developing countries, there has been relatively little research effort into new drugs in this field. Therefore, there is an acute need for new drug treatments which can help to combat schistosomiasis, and in particular, drugs which are effective against the juvenile form of schistosomes.

Another problematic parasitic disease is fascioliasis, which affects both human and animal populations. Caused by *Fasciola hepatica* and *Fasciola gigantica* liver flukes, fascioliasis causes an estimated $3.2 billion loss per annum in the global beef, lamb and milk industries. Triclabendazole is the only commercially available drug that is active against juvenile and adult stage liver flukes. Unfortunately, triclabendazole resistant liver flukes have been discovered throughout Africa, Asia, Australia, Europe, North America and South America. Because of this, new drugs to supplement and/or replace triclabendazole are urgently needed.

*Plasmodium* sp are responsible for the most important human parasitic disease, malaria, and lead to the deaths of >500K individuals per annum. The frontline chemotherapy for the most deadly *Plasmodium* species (*Plasmodium falciparum*) involves artemisinin-based combinations (ACTs). Unfortunately, resistance has developed to this frontline medication, especially in Southeast Asia. Therefore, new drugs are being sought.

Regarding bacterial infections, antimicrobial resistance (AMR) in bacteria poses a serious and growing threat to human and animal health. Several commentators believe that the world may be facing a "post-antibiotic" era where society may no longer be able to rely on the effectiveness of antimicrobial agents and medicines for maintaining public health. Some recent predictions indicate that by 2050 antimicrobial resistance will be the major cause of death in the world's population, causing approximately 10 million deaths per year, unless new effective antimicrobial agents are developed. Besides the human costs involved, such a high death rate may cause a reduction in GDP of 2 to 3.5% per year, equating to losses of USD 100 trillion a year due to AMR.

One strain of multidrug resistant bacteria which is particularly prevalent in hospital acquired infections and also more recently in community acquired infections is methicillin-resistant *Staphylococcus aureus*, also known as MRSA. MRSA causes infections in the skin and more serious infections in the blood, lung or urinary tract. The ongoing increase in MRSA infections results in longer hospital stays and also an increase in mortality of patients.

There is therefore a pressing need for the development of new antimicrobial agents with activity against MRSA and other Gram-positive bacteria.

WO 02/20463 A2 discloses compounds useful in modulating the farnesoid X receptor (FXR), which may be useful in the treatment of disorders such as obesity and diabetes. One specific compound disclosed in this document is compound 1:

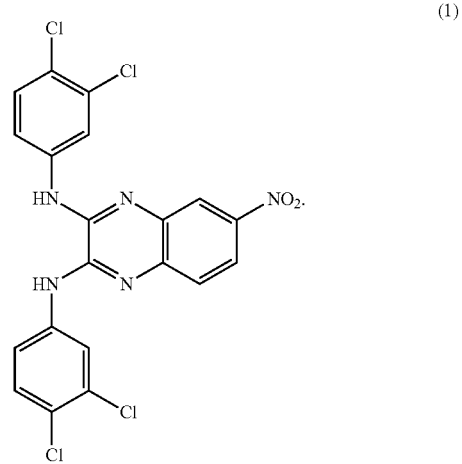 [SMILES: O=[N+]([O-])c1ccc2nc(Nc3ccc(Cl)c(Cl)c3)c(Nc3ccc(Cl)c(Cl)c3)nc2c1]

(1)

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which.

SUMMARY OF THE INVENTION

Figure 1A:
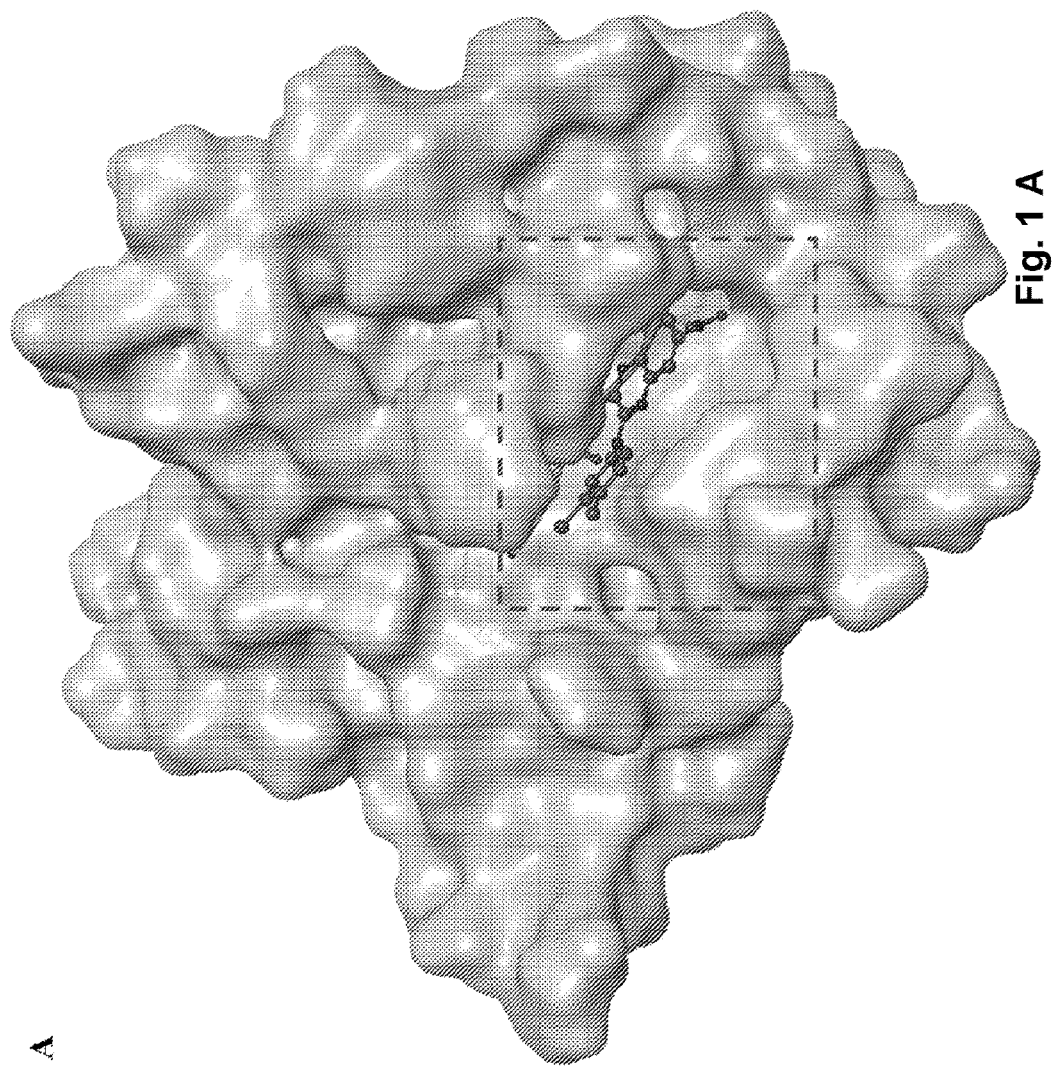
FIG. 1A-1B shows molecular docking study results which supports the hypothetical mechanism of action of the compounds on a protein lysine methyltransferase enzyme (Smp 138030).
Figure 1A:
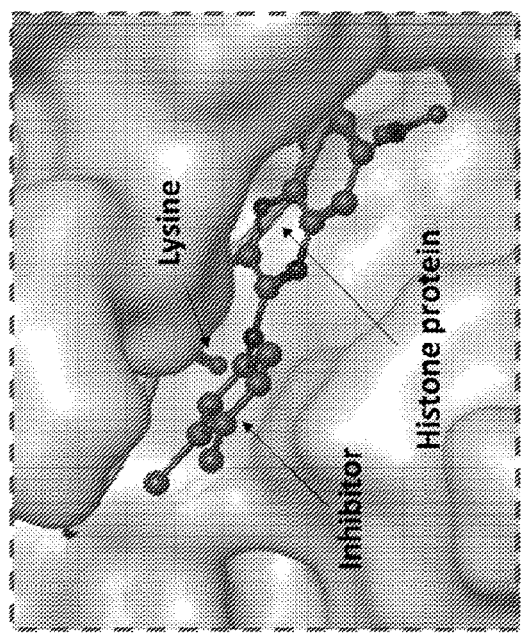
Figure 1B:
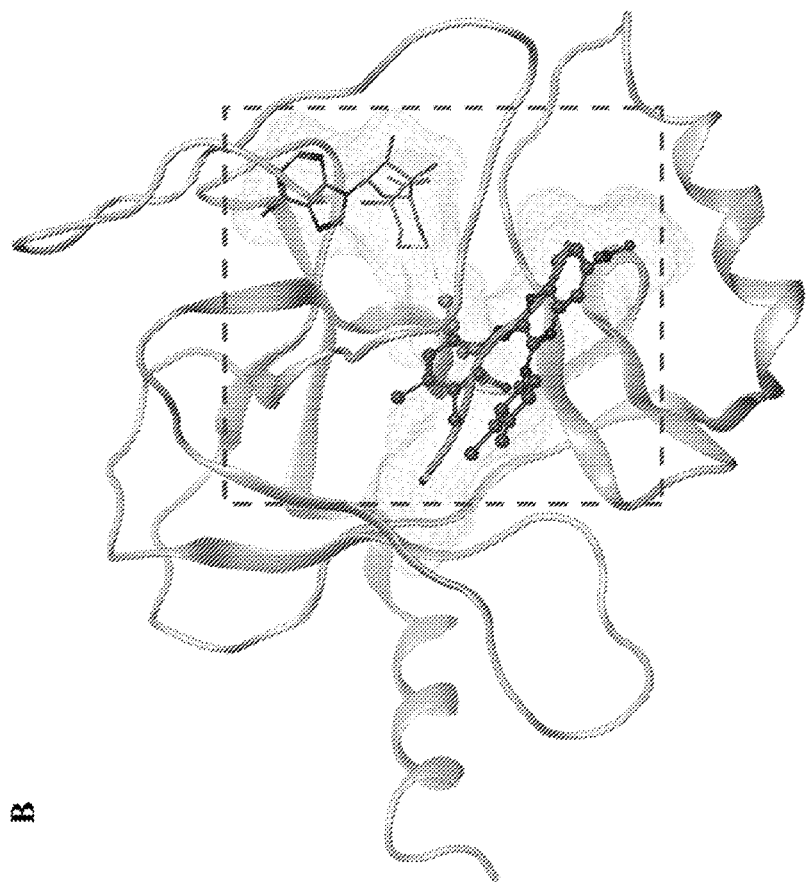
Figure 1B:
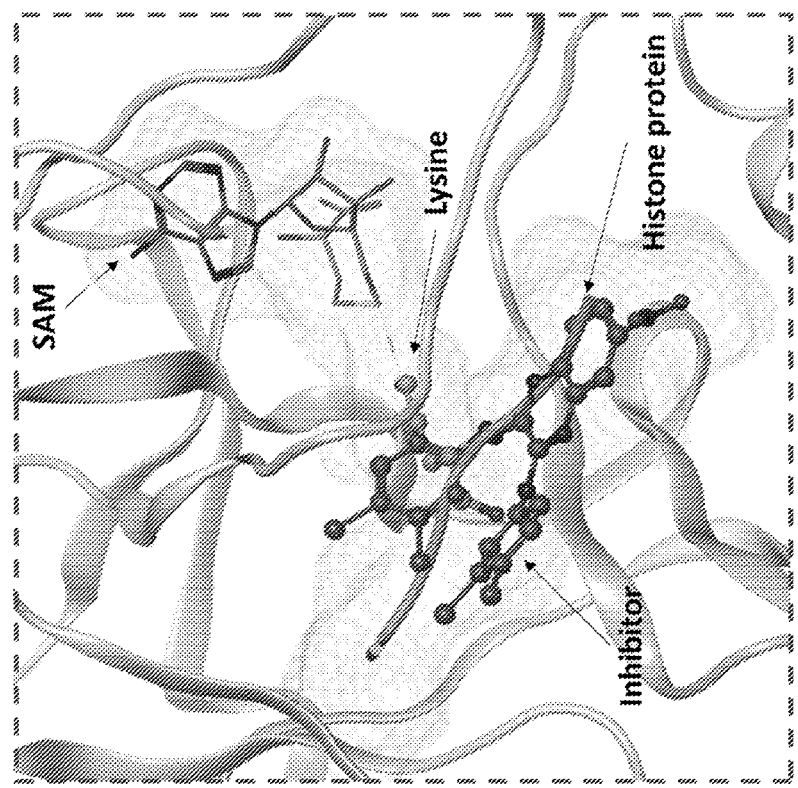

It is one aim of the present invention, amongst others, to provide a compound or a pharmaceutical composition for treating patients (humans or animals) infected with pathogenic organisms that addresses at least one disadvantage of the prior art, whether identified here or elsewhere, or to provide an alternative to existing compounds. For instance, it may be an aim of the present invention to provide a compound which is effective in treating schistosomiasis and/or bacterial infections. Furthermore, it may be an aim of the present invention to provide a compound which may be, additionally or alternatively, effective in treating fascioliasis and/or malaria.

According to aspects of the present invention, there is provided a compound and use as set forth in the appended claims. Other features of the invention will be apparent from the dependent claims, and the description which follows.

According to a first aspect of the present invention, there is provided a compound of formula (I), or a pharmaceutically acceptable salt or solvate thereof, for use in the treatment of a patient infected with pathogenic organisms;

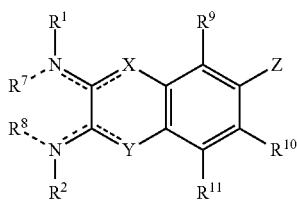

(I)

wherein X and Y are each independently selected from C, N, O and S, provided at least one of X and Y is N, O or S;

wherein $R^1$ and $R^2$ are each independently selected from a $C_1$-$C_8$ alkyl, a $C_1$-$C_8$ alkenyl, an aryl group, a heteroaryl group or an alkylaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a $(CO)OR^{13}$ or $(CO)NHR^{13}$ group wherein $R^{13}$ is selected from said groups;

wherein Z is selected from H, —CN, —$NO_2$, —$NR^3R^4$, —$NR^5(CO)R^6$; $C_1$-$C_4$ alkyl, $C_1$-$C_4$ alkoxy, —(CO)$WR^{12}$, hydroxy, amino, thiol, chloro, fluoro, $CF_3$, $CHF_2$ or $CH_2F$ groups; wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^3$ and $R^4$ are each independently selected from H, a $C_1$-$C_6$ alkyl, optionally forming a ring, a $C_1$-$C_6$ alkenyl, an aryl group, or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a $(CO)OR^{14}$ or $(CO)NHR^{14}$ group wherein $R^{14}$ is selected from said groups;

wherein $R^5$ is selected from H, a $C_1$-$C_6$ alkyl or a $C_1$-$C_6$ alkenyl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^6$ is selected from a $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a $(CO)OR^{15}$ or $(CO)NHR^{15}$ group wherein $R^{15}$ is selected from said groups;

wherein $R^7$ and $R^8$ are each independently selected from a H or a $C_1$-$C_4$ alkyl group;

wherein $R^9$, $R^{19}$ and $R^{11}$ are each independently selected from H, $C_1$-$C_4$ alkyl, $C_1$-$C_4$ alkoxy, —(CO)$WR^{12}$, hydroxy, amino, thiol, chloro, fluoro, $CF_3$, $CHF_2$ or $CH_2F$ groups; wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

In structure (I) the dotted lines represent bonds that may or may not be present depending on the identity of the atoms X and Y. Therefore $R^7$ and $R^8$ may or may not be present, depending on the identity of the atoms X and Y.

In some embodiments, both X and Y are sulphur, $R^7$ and $R^8$ are not present and the bonds shown in structure (II) are present. Therefore according to such embodiments of this first aspect of the present invention, there is provided a compound of formula (II), or a pharmaceutically acceptable salt or solvate thereof, for use in the treatment of a patient infected with pathogenic organisms;

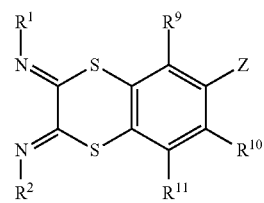

(II)

wherein $R^1$, $R^2$, $R^9$, $R^{10}$, $R^{11}$ and Z are as defined above.

In some embodiments, both X and Y are nitrogen, $R^7$ and $R^8$ are present and the bonds shown in structure (III) are present. Therefore according to such embodiments of this first aspect of the present invention, there is provided a compound of formula (III), or a pharmaceutically acceptable salt or solvate thereof, for use in the treatment of a patient infected with pathogenic organisms;

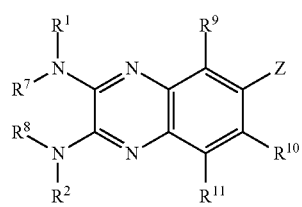

(III)

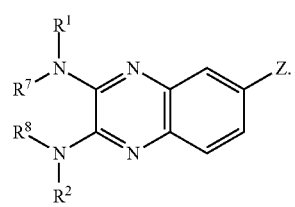

(IV)

wherein $R^1$ and $R^2$ are each independently selected from a $C_1$-$C_8$ alkyl, a $C_1$-$C_8$ alkenyl, an aryl group, a heteroaryl group or an alkylaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein Z is selected from $-NO_2$, $-NR^3R^4$, $-NR^5(CO)R^6$; $C_1$-$C_4$ alkyl, $C_1$-$C_4$ alkoxy, $-(CO)WR^{12}$, hydroxy, amino, thiol, chloro, fluoro, $CF_3$, $CHF_2$ or $CH_2F$ groups; wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^3$ and $R^4$ are each independently selected from H, a $C_1$-$C_6$ alkyl, optionally forming a ring, a $C_1$-$C_6$ alkenyl, an aryl group, or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^5$ is selected from H, a $C_1$-$C_6$ alkyl or a $C_1$-$C_6$ alkenyl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^6$ is selected from a $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^7$ and $R^8$ are each independently selected from a H or a $C_1$-$C_4$ alkyl group;

wherein $R^9$, $R^{10}$ and $R^{11}$ are each independently selected from H, $C_1$-$C_4$ alkyl, $C_1$-$C_4$ alkoxy, $-(CO)WR^{12}$, hydroxy, amino, thiol, chloro, fluoro, $CF_3$, $CHF_2$ or $CH_2F$ groups; wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

In the compounds of this first aspect, Z is suitably not H. Therefore Z is suitably selected from $-CN$, $-NO_2$, $-NR^3R^4$, $-NR^5(CO)R^6$; $C_1$-$C_4$ alkyl, $C_1$-$C_4$ alkoxy, $-(CO)WR^{12}$, hydroxy, amino, thiol, chloro, fluoro, $CF_3$, $CHF_2$ or $CH_2F$ groups; wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

Suitably $R^9$, $R^{10}$ and $R^{11}$ are each H and therefore the compound of this first aspect may have the following structure (IV):

The inventors have found that compounds according to this first aspect may be useful in the treatment of patients infected with pathogenic organisms, in particular *Schistosoma* parasites and bacteria such as *S. aureus*, *M. smegmatis*, MRSA, *Enterococcus faecalis*, *Pseudomonas aeruginosa*, *S. epidermidis* and *B. cereus*. In particular, the compounds of this aspect may also be effective in treating the juvenile form of *Schistosoma* parasites, which the current treatment praziquantel is ineffective against. Furthermore, the compounds according to this first aspect may be useful in the treatment of humans or animals infected with *Fasciola hepatica* or *Plasmodium parasites*.

Furthermore, the compounds according to this first aspect may be useful in the treatment of humans or animals infected with *Toxoplasma gondii*.

Regarding bacteria, the compounds according to this first aspect may be particularly useful in the treatment of *S. aureus*, MRSA or *Enterococcus faecalis*, suitably in the treatment of *S. aureus* or MRSA.

The compounds according to this first aspect may act as inhibitors of a protein lysine methyltransferase of a pathogenic organism. Therefore the compounds according to this first aspect may be useful in the treatment of a disease wherein the inhibition of protein lysine methyltransferase of a pathogenic organism is beneficial, such as the infections discussed above.

Suitably $R^1$ and $R^2$ are each independently selected from a $C_1$-$C_8$ alkyl, a $C_1$-$C_8$ alkenyl, an aryl group, a heteroaryl group or an alkylaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, fluoro, chloro, $CF_3$, $CHF_2$ or $CH_2F$ groups;

Suitably $R^1$ and $R^2$ are independently selected from an aryl group or an alkylaryl group, optionally substituted with one or more of $C_1$-$C_4$ alkyl, $C_1$-$C_4$ alkoxy, OH, $NH_2$, SH, chloro, fluoro, $CF_3$, $CHF_2$ or $CH_2F$ groups.

By alkylaryl group we mean a group having an alkyl chain linked to an aryl group, for example a group having the following structure (V):

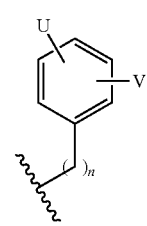

(V)

wherein n is an integer of at least 1, and U and V represent the optional substituents referred to above.

Suitably $R^1$ and $R^2$ have the structure of formula (V) wherein n is 0, 1, 2 or 3; wherein U and V are the optional substituents described above, in any position on the phenyl ring.

Suitably $R^1$ and $R^2$ are independently selected from an aryl group or an alkylaryl group optionally substituted with one or more methyl, methoxy, OH, Cl, F or $CF_3$ groups. In such embodiments the optional substituents of the $R^1$ and $R^2$ groups may be on any of the carbon atoms of the aryl group (or the aryl part of the alkylaryl group). Suitably the aryl group is a phenyl ring. Suitably the aryl group or alkylaryl group is substituted with one or more methyl, methoxy, OH, Cl, F or $CF_3$ groups. Therefore the compound of this first aspect suitably has the structure (VI):

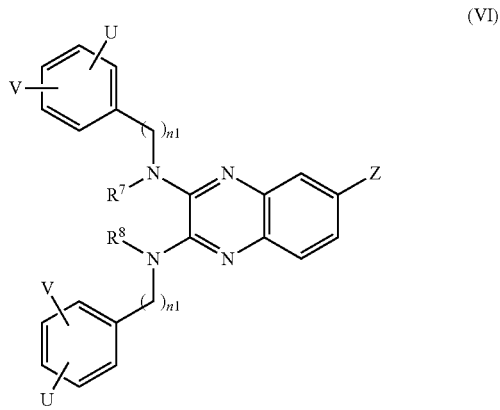

(VI)

wherein n1 and n2 are each independently=0, 1 or 2;
wherein each U is selected from methyl, methoxy, OH, Cl, F or $CF_3$;
wherein each V is optionally present and is, when present, selected from methyl, methoxy, OH, Cl, F or $CF_3$;
wherein Z is as defined above;
wherein $R^7$ and $R^8$ are each independently selected from a H or a $C_1$-$C_4$ alkyl, suitably wherein both $R^7$ and $R^8$ are H.

As shown in structure (VI), the U and V substituents may be present on any of the carbon atoms of the phenyl rings. The two phenyl rings may have the same or different substituents. Suitably the two phenyl rings are the same (i.e. have the same substituents in the same positions).

Suitably the groups $R^1$ and $R^2$ are the same.

Suitably the groups $R^1$ and $R^2$ are the same; n1 and n2 are each=0; each U is selected from methyl, methoxy, OH, Cl, F or $CF_3$; each V is optionally present and is, when present, selected from methyl, methoxy, OH, Cl, F or $CF_3$; Z is as defined above; and both $R^7$ and $R^8$ are H.

Suitably $R^1$ and $R^2$ are the same and are selected from:

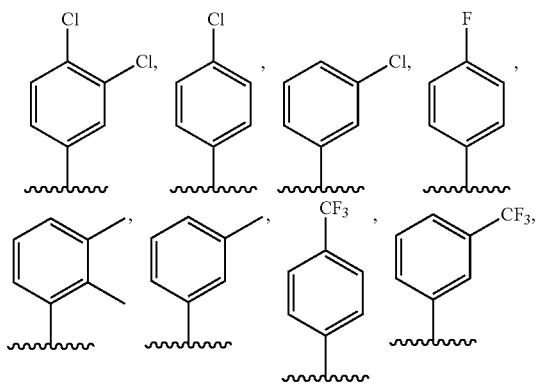

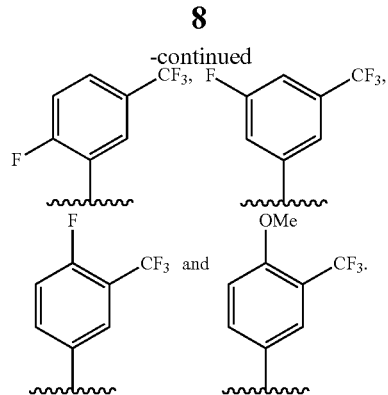

In the compound of this first aspect, suitably $R^7$ and $R^8$ are both H.

In the compound of this first aspect, Z may be selected from —$NO_2$, —$NR^3R^4$, —$NR^5(CO)R^6$. In some embodiments, Z is —$NO_2$. In such embodiments, suitably the groups $R^1$ and $R^2$ are the same; n1 and n2 are each=0; each U is selected from methyl, methoxy, OH, Cl, F or $CF_3$; each V is optionally present and is, when present, selected from methyl, methoxy, OH, Cl, F or $CF_3$; Z is as defined above; and both $R^7$ and $R^8$ are H.

In some embodiments Z is —$NR^3R^4$ or —$NR^5(CO)R^6$.

In embodiments wherein Z is —$NR^3R^4$, $R^3$ and $R^4$ are suitably each independently selected from H, a $C_1$-$C_6$ alkyl, optionally forming a ring, a $C_1$-$C_6$ alkenyl, an aryl group, or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

Suitably $R^3$ and $R^4$ are suitably each independently selected from H, a $C_1$-$C_6$ alkyl, optionally forming a ring, a $C_1$-$C_6$ alkenyl or an aryl group, optionally substituted with one or more of $C_1$-$C_4$ alkoxy, chloro, fluoro, $CF_3$, $CHF_2$ or $CH_2F$ groups. Suitably $R^3$ and $R^4$ are independently selected from H, a $C_1$-$C_6$ alkyl, optionally forming a ring, optionally substituted with one or more of $C_1$-$C_2$ alkoxy, F, Cl and $CF_3$ groups.

In embodiments wherein Z is —$NR^3R^4$ and $R^3$ and $R^4$ are $C_1$-$C_6$ alkyl forming a ring, Z may therefore be a cycloamine group, for example a group selected from the following:

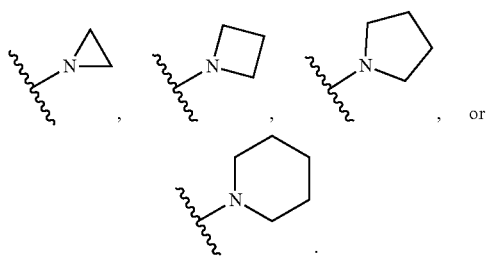

, or

In embodiments wherein Z is —$NR^5(CO)R^6$, $R^5$ is suitably selected from H, a $C_1$-$C_6$ alkyl or a $C_1$-$C_6$ alkenyl; and $R^6$ is suitably selected from a $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

$R^6$ is suitably selected from a $C_1$-$C_6$ alkyl, a $C_1$-$C_6$ alkenyl, an aryl group or a heteroaryl group, optionally substituted with one or more of $C_1$-$C_4$ alkyl, $C_1$-$C_4$ alkoxy, hydroxy, chloro, fluoro, $CF_3$, $CHF_2$ or $CH_2F$ groups.

Suitably $R^5$ is H or methyl.

Suitably $R^6$ is selected from a $C_1$-$C_6$ alkyl, an aryl group or a heteroaryl group, optionally substituted with one or more of $C_1$-$C_2$ alkyl, $C_1$-$C_2$ alkoxy, OH, F, Cl or $CF_3$ groups.

Suitably Z is selected from:

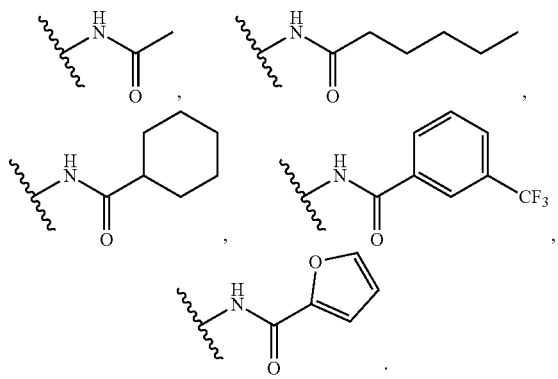

In such embodiments, suitably the groups $R^1$ and $R^2$ are the same; n1 and n2 are each=0; each U is selected from methyl, methoxy, OH, Cl, F or $CF_3$; each V is optionally present and is, when present, selected from methyl, methoxy, OH, Cl, F or $CF_3$; Z is as defined above; and both $R^7$ and $R^8$ are H.

In some embodiments, the compound of this first aspect is selected from compounds 1 and 4-21 described below.

The compound, or a pharmaceutically acceptable salt or solvate thereof, according to the first aspect is for use in the treatment of a patient infected with pathogenic organisms. In some embodiments, the patient is infected with schistosome parasites, suitably wherein the schistosome parasites are *Schistosoma haematobium, Schistosoma japonicum* or *Schistosoma mansoni*.

In some embodiments, the patient is a human or animal infected with liver fluke parasites, suitably wherein the parasites are *Fasciola hepatica, Fasciola gigantica, Opisthorchis viverrini* or *Clonorchis sinensis*.

In some embodiments, the patient is a human or animal, suitably an animal, infected with a *Fasciola hepatica* parasite.

In some embodiments, the patient is a human or animal infected with a *Plasmodium* parasite.

In some embodiments, the patient is infected with a pathogenic bacteria, suitably wherein the pathogenic bacteria is selected from *S. aureus, M. smegmatis*, MRSA, *Enterococcus faecalis, Pseudomonas aeruginosa, S. epidermidis* and *B. cereus*, suitably *S. aureus*, MRSA or *Enterococcus faecalis*. Suitably *S. aureus* or MRSA.

Suitably this first aspect provides a compound of formula (I) as defined above, or a pharmaceutically acceptable salt or solvate thereof, for use in the treatment of a patient infected with pathogenic organisms; wherein the pathogenic organisms which the patient is infected with are parasites selected from schistosome, *Fasciola* or *Plasmodium* parasites or are pathogenic bacteria selected from *S. aureus*, MRSA or *Enterococcus faecalis*.

In some embodiments, this first aspect of the invention provides a compound of formula (I), or a pharmaceutically acceptable salt or solvate thereof, for use in the treatment of a patient infected with pathogenic organisms; wherein the pathogenic organisms which the patient is infected with are parasites selected from schistosome, *Fasciola* or *Plasmodium* parasites or are pathogenic bacteria selected from *S. aureus* and MRSA;

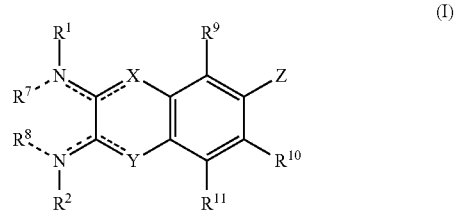

(I)

wherein X and Y are each independently selected from C, N, O and S, provided at least one of X and Y is N, O or S;

wherein $R^1$ and $R^2$ are each independently selected from a $C_1$-$C_8$ alkyl, a $C_1$-$C_8$ alkenyl, an aryl group, a heteroaryl group or an alkylaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a $(CO)OR^{13}$ or $(CO)NHR^{13}$ group wherein $R^{13}$ is selected from said groups;

wherein Z is selected from —CN, —$NO_2$, —$NR^3R^4$, —$NR^5(CO)R^6$; $C_1$-$C_4$ alkyl, $C_1$-$C_4$ alkoxy, —(CO)$WR^{12}$, hydroxy, amino, thiol, chloro, fluoro, $CF_3$, $CHF_2$ or $CH_2F$ groups; wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^3$ and $R^4$ are each independently selected from H, a $C_1$-$C_6$ alkyl, optionally forming a ring, a $C_1$-$C_6$ alkenyl, an aryl group, or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a $(CO)OR^{14}$ or $(CO)NHR^{14}$ group wherein $R^{14}$ is selected from said groups;

wherein $R^5$ is selected from H, a $C_1$-$C_6$ alkyl or a $C_1$-$C_6$ alkenyl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^6$ is selected from a $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a $(CO)OR^{15}$ or $(CO)NHR^{15}$ group wherein $R^{15}$ is selected from said groups;

wherein $R^7$ and $R^8$, when present, are each independently selected from a H or a $C_1$-$C_4$ alkyl;

wherein $R^9$, $R^{19}$ and $R^{11}$ are each independently selected from H, $C_1$-$C_4$ alkyl, $C_1$-$C_4$ alkoxy, —(CO)$WR^{12}$, hydroxy, amino, thiol, chloro, fluoro, $CF_3$, $CHF_2$ or $CH_2F$ groups; wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

According to a second aspect of the present invention, there is provided a compound of formula (III), or a pharmaceutically acceptable salt or solvate thereof;

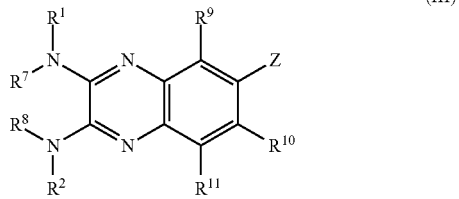

(III)

wherein $R^1$ and $R^2$ are independently selected from a $C_1$-$C_8$ alkyl, a $C_1$-$C_8$ alkenyl, an aryl group or an alkylaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, fluoro, chloro, $CF_3$, $CHF_2$ or $CH_2F$ groups;

wherein Z is selected from —$NR^3R^4$ or —$NR^5(CO)R^6$;

wherein $R^3$ and $R^4$ are each independently selected from H, a $C_1$-$C_6$ alkyl, optionally forming a ring, a $C_1$-$C_6$ alkenyl, an aryl group, or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^5$ is selected from H, a $C_1$-$C_6$ alkyl or a $C_1$-$C_6$ alkenyl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^6$ is selected from a $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^7$ and $R^8$ are each independently selected from a H or a $C_1$-$C_4$ alkyl;

wherein $R^9$, $R^{19}$ and $R^{11}$ are each independently selected from H, $C_1$-$C_4$ alkyl, $C_1$-$C_4$ alkoxy, —$(CO)WR^{12}$, hydroxy, amino, thiol, chloro, fluoro, $CF_3$, $CHF_2$ or $CH_2F$ groups; wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, amino, thiol, chloro, fluoro, $CF_3$, $CHF_2$ or $CH_2F$ groups.

The compound, or a pharmaceutically acceptable salt or solvate thereof, of this second aspect may have any of the suitable features and advantages discussed in relation to the first aspect.

Suitably $R^1$ and $R^2$ are independently selected from an aryl group or an alkylaryl group, optionally substituted with one or more of $C_1$-$C_4$ alkoxy, hydroxy, chloro, fluoro, $CF_3$, $CHF_2$ or $CH_2F$ groups.

Suitably $R^1$ and $R^2$ are independently selected from an aryl group or an alkylaryl group substituted with one or more methyl, methoxy, hydroxy, Cl, F or $CF_3$ groups.

According to a third aspect of the present invention, there is provided a compound according to the second aspect, for use as a medicament.

According to a fourth aspect of the present invention, there is provided a compound according to the second aspect, for use in the treatment of a patient infected with pathogenic organisms.

The treatment of this fourth aspect may have any of the suitable features referred to in relation to the first aspect.

According to a fifth aspect of the present invention, there is provided a pharmaceutical composition comprising a therapeutically effective amount of a compound according to the first or second aspects, or a pharmaceutically acceptable salt or solvate thereof, and a pharmaceutically acceptable excipient.

According to a sixth aspect of the present invention, there is provided a method of treating a patient infected with pathogenic organisms, the method comprising administering to said patient a therapeutically effective amount of a compound according to the first or second aspects, or a pharmaceutically acceptable salt or solvate thereof, or a pharmaceutical composition according to the fourth aspect.

The treatment of this sixth aspect may have any of the suitable features referred to in relation to the first aspect.

According to a seventh aspect of the present invention, there is provided a use of a compound according to the first or second aspects, for disinfecting a surface, for example a surface comprising pathogenic bacteria. The use of this seventh aspect suitably involves applying the compound or a composition comprising the compound to the surface, for example by spraying. The surface is suitably a surface of a non-living article. Therefore this use suitably relates to an in vitro application of the compound or composition containing said compound to said surface.

In some embodiments, the surface is a surface of a surgical device or a surgical implant, prior to the device or implant contacting a living tissue.

The compound may have any of the suitable features or advantages described in relation to the first and second aspects. The pathogenic bacteria may be as described in the first aspect.

GENERAL EXPERIMENTAL DETAILS

Reagents, Solvents and Other General Information

All solvents and reagents commercially available were used as supplied from Sigma-Aldrich, Fluorochem or other commercial sources without further purification or treatment. The only exception was compound 2,3-Dichloro-6-nitroquinoxaline (product code 49489—Fluorochem, compound 2, MW=244.03) that contained also compound 3 (6-nitroquinoxaline-2,3-diol, MW=207.15). From NMR analysis, this Fluorochem product resulted a mixture of compounds 2 and 3 in a ratio 3:1.

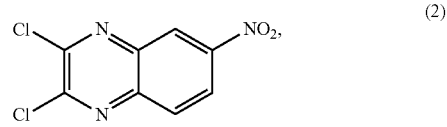

(2)

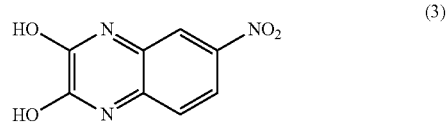

(3)

This mixture was purified by dissolving 500 mg in dichloromethane (DCM, 200 ml) and washing four times with sodium hydroxide (NaOH 1N, 20 ml for each wash) until no traces of compound 3 were detected using Thin Layer Chromatography (TLC). The organic phase was washed once with brine (15 ml), dried over anhydrous $Na_2SO_4$, filtered and reduced to dryness to give the pure compound 2 (350 mg). The basic solution (derived from the extraction) was acidified with 6N hydrochloric acid until pH 5. The aqueous solution was then extracted with ethyl acetate (EtOAc, 15 ml) for four times. The combined organic phase was washed with brine, dried over anhydrous $Na_2SO_4$, filtered and reduced to dryness to give the pure compound 3 (125 mg). The structures of these compounds were confirmed by NMR and the spectra agreed with the data reported in public spectra databases.

The following solvents were purchased as anhydrous: N,N-dimethylsulfoxide (DMSO) and acetonitrile ($CH_3CN$). Other solvent used in this chapter were: dichloromethane (DCM), ethyl acetate (EtOAc) and n-hexane.

All glassware was dried in the oven at 130° C. for 2 hours and allowed to cool down to room temperature before use. Reactions under MWI conditions (Microwave Irradiation) were performed in a CEM Discover microwave system in closed vessel mode.

Thin Layer Chromatography

All reactions were monitored by Thin Layer Chromatography (TLC) on commercially available Merck Kieselgel 60 F254 plates (105554, Merck). The TLC were eluting with n-hexane/EtOAc in different proportions depending on the specific compound being synthesised. Separated components were visualized using ultra violet light (245 and 366 nm).

FLASH Column Chromatography (CC)

Flash column chromatography was performed on Interchim PuriFlash 430 using high performance silica gel particle size 50 micron cartridges. Samples were applied onto silica gel as a concentrated solution in DCM (replaced by EtOAc if the sample was not soluble in DCM).

The sample was purified with n-hexane/EtOAc in different proportions depending on the specific compound being synthesised. The fractions containing the desired product were analysed by TLC then combined together and the solvent removed under vacuum.

NMR Spectroscopy $^1H$ and $^{13}C$ were recorded on a Brucker Avance 500 spectrometer (500 and 126 MHz respectively) at 25° C. Spectra were calibrated to the residual signal of the deuterated solvent used (Deuterated DMSO—DMSO-d6—was used for all the compounds shown in this chapter). MestReNova (v6.0.2-5475) NMR processing software was used for the assignment of peaks and calculation of coupling constants. Chemical shifts δ were given in parts per million (ppm) and rounded to two decimal places. The following abbreviations were used in the NMR signals assignment: s for singlet, br s for broad singlet, d for doublet, t for triplet, q for quartet, m for multiplet. Coupling constants (J) were measured in Hertz (Hz) and rounded to one decimal place.

High Performance Liquid Chromatography (HPLC)

Ultra-performance liquid chromatography-mass spectrometry (UPLC-MS) analysis was used for purity/mass determination of the tested compounds using a Waters UPLC system with both Diode Array detection and Electrospray $(ESI)^+$ MS detection. The stationary phase was a Waters Acquity UPLC BEH C18 1.7 um 2.1×50 mm column. The mobile phase was $H_2O$ containing 0.1% Formic acid (A) and $CH_3CN$ containing 0.1% Formic acid (B). Column temperature was 40° C., the sample diluent was acetonitrile and the sample concentration was 1 μg/mL. Injection volume of sample was 2 μL under a flow rate of 0.5 mL/min. The method used included a run time of 3 min, compromising an isocratic elution at 90% A (0.1 min), followed by a 1.4 min gradient from 10% to 100% of B, followed by 1.4 min isocratic elution at 100% of B, followed by 0.1 min gradient to initial conditions. Galaxie Chromatography Data System was used for analysis of data.

All compounds tested in the biological assays were >95% pure. Purity of intermediates was >90%, unless otherwise stated.

Preparation of Compounds

Standard Procedure 1a: Preparation of N—$(CH_2)_n$ Aromatic Analogues of Compound 1

To a stirring solution of mixture of purified 2,3-dichloroquinoxaline (compound 2, 1 equivalent—1 eq.) in anhydrous DMSO under a nitrogen atmosphere, the appropriate aniline or phenyl-alkyl amine (5 eq.) was added. The reaction mixture was left stirring at 130° C. for 30 min. The reaction was monitored by TLC with n-hexane/EtOAc (7:3). After completion of the reaction, the mixture was diluted with EtOAc and poured into ice water. The aqueous phase was extracted with EtOAc three times, the combined organic phase was then washed with 6N hydrochloric acid (4 times) and once with brine solution. The organic phase was then dried over anhydrous $Na_2SO_4$, filtered and reduced to dryness to give a crude product. The crude product was purified by flash chromatography (Biotage Isolera One) eluting with n-hexane/EtOAc in different proportions depending on the specific analogue being synthesised. This procedure provided compounds of general formula (VII):

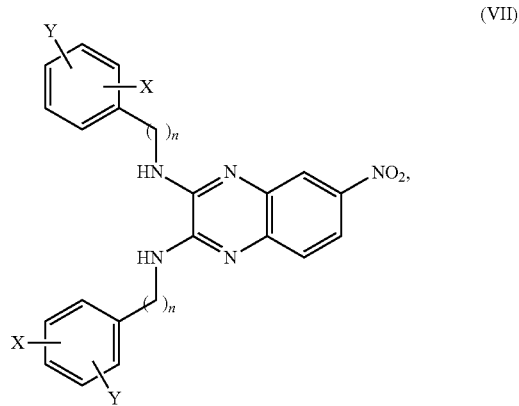

wherein n=0, 1 or 2;

Standard Procedure 1b: Preparation of N-Acyl Derivatives of Compound 1

To a solution of compound 15 (1 eq.) dissolved in anhydrous DCM, anhydrous pyridine (3.6 eq.) was added under nitrogen. The appropriate acyl derivate (1.1 eq.) was added dropwise to the above solution cooled to 0° C. in an ice-bath under nitrogen. The resulting mixture was stirred at room temperature for 1 hour. After completion, the reaction mixture was diluted with DCM and quenched with saturated aqueous of sodium bicarbonate ($NaHCO_3$). The organic phase was washed first with saturated aqueous $NaHCO_3$ (three times) and brine (once). The organic layer was then dried over anhydrous $Na_2SO_4$, filtered and reduced to dryness to give a crude product.

The crude product was purified by flash chromatography (Biotage Isolera One) eluting with n-hexane/EtOAc in different proportions depending on the specific analogue being synthesised. This procedure provided compounds of general formula (VIII):

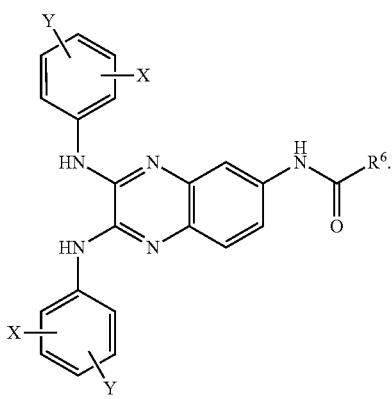

(VIII)

Experimental Section and Spectra Data

Synthesis of $N^2$, $N^3$-bis(3,4-dichlorophenyl)-6-nitro-quinoxaline-2,3-diamine (Compound 1)

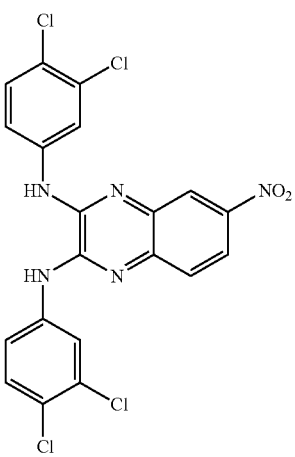

(1)

Chemical Formula: $C_{20}H_{11}Cl_4N_5O_2$, Molecular Weight: 495.14

Prepared according to Standard Procedure 1a, compound 1 was prepared from 2,3-dichloroquinoxaline 2 (0.50 g, 2.00 mmol) and 3,4-dichloroaniline (1.62 g, 10 mmol) in DMSO (25 ml) for 30 min at 130° C. After completion of the reaction, the mixture was diluted with EtOAc (20 ml) and poured into ice water. The aqueous phase was extracted with EtOAc (3×10 ml), the combined organic phase was then washed with 6N hydrochloric acid (4×10 ml) and once with brine (15 ml). The combined organic phase was dried over anhydrous $Na_2SO_4$, filtered and evaporated. The crude product was purified by automated flash column chromatography eluting with n-hexane:EtOAc 100:0 v/v increasing to 70:30 v/v in 10 column volumes (CV). The final product 1 was obtained in 36% yield as a red powder. $^1$H NMR (500 MHz, DMSO-d6) δ 9.52 (s, 2H, 2×NH), 8.34-8.18 (m, 3H, 3×ArH), 8.11 (d, J=8.9 Hz, 1H, ArH), 7.87 (m, 2H, 2×ArH), 7.65 (dd, J=8.8, 6.9 Hz, 3H, 3×ArH). $^{13}$C NMR (126 MHz, DMSO) δ 139.65 (ArC), 130.95 (ArC), 130.57 (3×ArCH), 124.98 (ArC), 124.50 (ArC), 122.26 (ArCH), 121.66 (ArCH), 121.13 (ArCH), 120.82 (ArCH), 120.61 (ArCH), 119.87 (ArCH). UPLC-MS: $t_R$ 2.526 min. MS (ESI)$^+$ m/z calculated 496.14 [M+H]$^+$, observed 494.00-496.08-498.02 [M+H]$^+$. Note: Data agrees with previously published papers (Jonathan, 2002; Kher et al., 2015).

Synthesis of $N^2$, $N^3$-bis(4-chlorophenyl)-6-nitroquinoxaline-2,3-diamine (Compound 4)

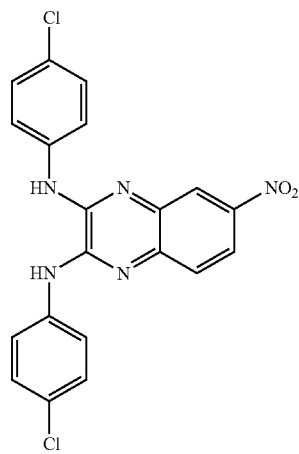

(4)

Chemical Formula: $C_{20}H_{13}Cl_2N_5O_2$, Molecular Weight: 426.26

Prepared according to Standard Procedure 1a, compound 4 was derived from 2,3-dichloroquinoxaline 2 (0.17 g, 0.70 mmol) and 4-chloroaniline (0.45 g, 3.52 mmol) in DMSO (9 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 10 CV. The final product 4 was obtained at 41% yield as a brown powder. $^1$H NMR (500 MHz, DMSO-d6) δ 9.57 (s, 1H, NH), 9.41 (s, 1H, NH), 8.34-8.27 (m, 1H, ArH), 8.10 (dd, J=7.9, 4.2 Hz, 1H, ArH), 7.95 (ddd, J=13.9, 8.7, 1.9 Hz, 4H, ArH), 7.64 (dd, J=9.4, 4.1 Hz, 1H, ArH), 7.48 (ddd, J=8.9, 4.0, 1.4 Hz, 4H, ArH). $^{13}$C NMR (126 MHz, DMSO) δ 144.39 (ArC), 143.41(ArC), 142.70 (ArC), 141.40 (ArC), 138.87 (ArC), 138.54 (ArC), 135.59 (ArC), 129.06 (4×ArCH), 127.89 (ArCCl), 127.36 (ArCCl), 126.50 (ArCH), 123.49 (2×ArCH), 122.96 (2×ArCH), 121.12 (ArCH), 119.84 (ArCH). UPLC-MS: $t_R$ 2.763 min. MS (ESI)$^+$ m/z calculated 427.26 [M+H]$^+$, observed 426.18-428.19 [M+H]$^+$.

Synthesis of N², N³-bis(3-chlorophenyl)-6-nitroquinoxaline-2,3-diamine (Compound 5)

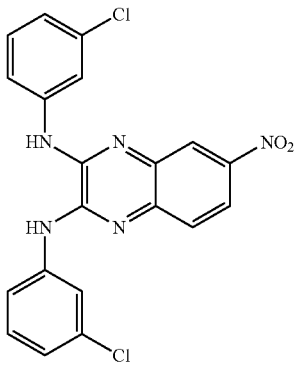

(5)

Chemical Formula: C₂₀H₁₃Cl₂N₅O₂, Molecular Weight: 426.26

Prepared according to Standard Procedure 1a, compound 5 was synthesised from 2,3-dichloroquinoxaline 2 (0.09 g, 0.38 mmol) and 3-chloroaniline (0.24 g, 1.90 mmol) in DMSO (5 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 14 CV. The final product 5 was obtained at 40% yield as a yellow powder. ¹H NMR (500 MHz, DMSO-d6) δ 9.57 (s, 1H, NH), 9.42 (s, 1H, NH), 8.31 (d, J=2.7 Hz, 1H, ArH), 8.17-8.03 (m, 3H, 3×ArH), 7.86 (dd, J=23.1, 8.2 Hz, 2H, 2×ArH), 7.68 (d, J=8.8 Hz, 1H, ArH), 7.46 (td, J=8.1, 2.5 Hz, 2H, 2×ArH), 7.20 (dd, J=11.9, 8.5 Hz, 2H, 2×ArH). ¹³C NMR (126 MHz, DMSO) δ 144.04 (ArC), 142.92 (ArC), 142.20 (ArC), 140.96 (ArC), 140.82 (ArC), 140.69 (ArC), 135.04 (ArCCl), 132.98 (ArCCl), 130.41 (3×ArCH), 126.22 (ArCH), 123.31 (ArCH), 122.88 (ArCH), 120.74 (ArCH), 120.64 (ArCH), 120.09 (ArCH), 119.64 (ArCH), 119.13 (ArCH). UPLC-MS: $t_R$ 2.785 min. MS (ESI)⁺ m/z calculated 427.26 [M+H]⁺, observed 426.20-428.18 [M+H]⁺.

Synthesis of N², N³-bis(4-fluorophenyl)-6-nitroquinoxaline-2,3-diamine (Compound 6)

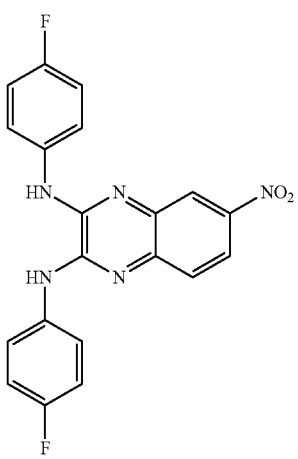

(6)

Chemical Formula: C₂₀H₁₃F₂N₆O₂, Molecular Weight: 393.35

Compound 6 was prepared according to Standard Procedure 1a from 2,3-dichloroquinoxaline 2 (0.10 g, 0.41 mmol) and 4-fluoroaniline (0.23 g, 2.05 mmol) in DMSO (5 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 10 CV. The final product 6 was obtained at 10% yield as an orange powder. ¹H NMR (500 MHz, DMSO-d6) δ 9.56 (s, 1H, NH), 9.39 (s, 1H, NH), 8.29 (d, J=2.6 Hz, 1H, ArH), 8.19 (dd, J=9.1, 5.0 Hz, 1H, ArH), 8.10 (d, J=8.9 Hz, 1H, ArH), 7.94 (dd, J=16.4, 10.6 Hz, 3H, 3×ArH), 7.67-7.60 (m, 1H, ArH), 7.29 (td, J=8.6, 4.3 Hz, 4H, 4×ArH). ¹³C NMR (126 MHz, DMSO) δ 176.35 (2×ArC), 143.88 (ArC), 143.35 (ArC), 142.61 (ArC), 141.32 (ArC), 135.84 (ArC), 135.83 (ArC), 135.37 (ArC), 126.11 (ArCH), 123.86 (ArCH), 123.79 (ArCH), 123.26 (ArCH), 123.20 (ArCH), 120.69 (ArCH), 119.43 (ArCH), 115.71 (ArCH), 115.67 (ArCH), 115.53 (ArCH), 115.49 (ArCH). UPLC-MS: $t_R$ 2.557 min. MS (ESI)⁺ m/z calculated 394.35 [M+H]⁺, observed 394.24 [M+H]⁺.

Synthesis of N², N³-bis(4-fluoro-3-(trifluoromethyl)phenyl)-6-nitroquinoxaline-2,3-diamine (Compound 7)

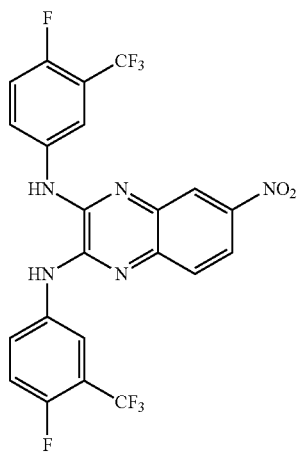

(7)

Chemical Formula: C₂₂H₁₁F₈N₆O₂, Molecular Weight: 529.35

According to Standard Procedure 1a, compound 7 was prepared from 2,3-dichloroquinoxaline 2 (0.12 g, 0.49 mmol) and 4-fluoro-3-(trifluoromethyl) aniline (0.44 g, 2.46 mmol) in DMSO (6 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 10 CV. The final product 7 was obtained at 60% yield as a red powder. ¹H NMR (500 MHz, DMSO-d6) δ 9.61 (s, 2H, 2×NH), 8.32 (br s, 2H, 2×ArH), 8.23 (d, J=13.8 Hz, 3H, 3×ArH), 8.10 (br s, 1H, ArH), 7.57 (ddd, J=17.4, 11.5, 7.0 Hz, 3H, 3×ArH). ¹³C NMR (126 MHz, DMSO) δ 174.16 (ArC), 144.17 (ArC), 142.96 (ArC), 142.25 (ArC), 140.72 (ArC), 136.27 (ArC), 135.96 (ArC), 135.04 (ArC), 127.22 (ArCH), 126.74 (ArCH), 126.26 (ArCH), 124.73 (ArC), 123.71 (ArC), 120.74 (ArCH), 119.81 (ArCH), 119.18 (ArCH), 118.62 (ArCH), 117.80 (ArCH), 117.63 (ArCH). UPLC-MS: $t_R$ 2.801 min. MS (ESI)$^+$ m/z calculated 530.35 [M+H]$^+$, observed 530.08 [M+H]$^+$.

Synthesis of N$^2$, N$^3$-bis(3-fluoro-5-(trifluoromethyl)phenyl)-6-nitroquinoxaline-2,3-diamine (Compound 8)

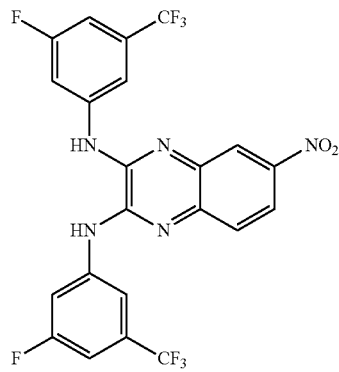

(8)

Chemical Formula: $C_{22}H_{11}F_8N_6O_2$, Molecular Weight: 529.35

Prepared according to Standard Procedure 1a, compound 8 was synthesised from 2,3-dichloroquinoxaline 2 (0.09 g, 0.36 mmol) and 3-fluoro-5-(trifluoromethyl) aniline (0.32 g, 1.8 mmol) in DMSO (5 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 15 CV. The final product 8 was obtained at 10% yield as an orange powder. $^1$H NMR (500 MHz, DMSO-d6) δ 9.71 (br s, 2H, 2×NH), 8.34-8.18 (m, 3H, 3×ArH), 8.10 (d, J=8.9 Hz, 1H, ArH), 7.92 (d, J=31.7 Hz, 2H, 2×ArH), 7.65 (d, J=9.0 Hz, 1H, ArH), 7.33 (dd, J=24.4, 8.3 Hz, 2H, 2×ArH). $^{13}$C NMR (126 MHz, DMSO) δ 163.17 (ArC), 161.24 (ArC), 147.21 (ArC), 144.53 (ArC), 142.61 (ArC), 141.94 (ArC), 140.41 (ArC), 134.88 (ArC), 131.00 (ArC), 126.63 (ArCH), 124.55 (ArC), 122.38 (ArC), 121.11 (ArCH), 120.20 (ArCH), 113.19 (ArCH), 112.71 (ArCH), 111.02 (ArCH), 110.82 (ArCH), 110.58 (ArCH), 110.36 (ArCH). UPLC-MS: $t_R$ 2.882 min. MS (ESI)$^+$ m/z calculated 530.35 [M+H]$^+$, observed 529.98 [M]$^+$.

Synthesis of N$^2$, N$^3$-bis(2-fluoro-5-(trifluoromethyl)phenyl)-6-nitroquinoxaline-2,3-diamine (Compound 9)

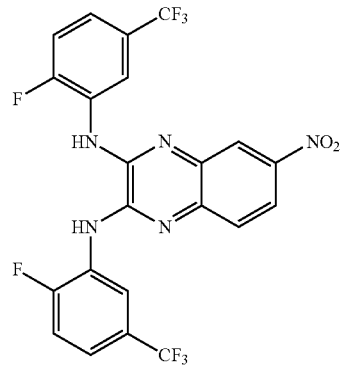

(9)

Chemical Formula: $C_{22}H_{11}F_8N_6O_2$, Molecular Weight: 529.35

According to Standard Procedure 1a, compound 9 was prepared from 2,3-dichloroquinoxaline 2 (0.16 g, 0.66 mmol) and 2-fluoro-5-(trifluoromethyl) aniline (0.59 g, 3.3 mmol) in DMSO (5 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 12 CV. The final product 9 was obtained at 10% yield as a yellow powder. $^1$H NMR (500 MHz, DMSO-d6) δ 9.63 (br s, 2H, 2×NH), 7.67-7.48 (m, 4H, 4×ArH), 7.26 (dd, J=11.6, 8.3 Hz, 1H, ArH), 7.12 (dd, J=20.4, 10.5 Hz, 1H, ArH), 6.93-6.86 (m, 1H, ArH), 6.74-6.67 (m, 1H, ArH), 6.63 (dd, J=8.2, 1.8 Hz, 1H, ArH). $^{13}$C NMR (126 MHz, DMSO) δ 157.91 (ArC), 153.77 (ArC), 143.90 (ArC), 135.84 (ArC), 132.90 (ArCH), 131.10 (ArCH), 128.72 (ArCH), 125.29 (ArC), 124.53 (ArCH), 122.03 (ArCH), 118.78 (ArC), 115.49 (ArCH), 115.33 (ArCH), 115.19 (ArCH), 115.03 (ArCH), 114.93 (ArC), 111.95 (ArC). UPLC-MS: $t_R$ 2.378 min. MS (ESI)$^+$ m/z calculated 530.35 [M+H]$^+$, observed 530.05 [M+H]$^+$.

Synthesis of 6-nitro-N$^2$, N$^3$-bis(3-(trifluoromethyl)phenyl)quinoxaline-2,3-diamine (Compound 10)

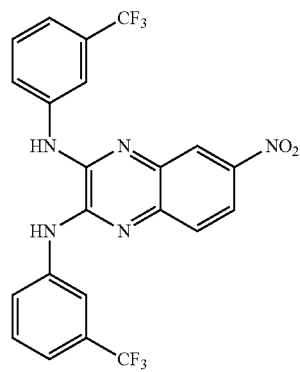

(10)

Chemical Formula: $C_{22}H_{13}F_6N_6O_2$, Molecular Weight: 493.37

Compound 10 was prepared according to Standard Procedure 1a from 2,3-dichloroquinoxaline 2 (0.15 g, 0.61 mmol) and 3-(trifluoromethyl) aniline (0.49 g, 3.1 mmol) in DMSO (8 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 12 CV. The final product 10 was obtained at 30% yield as a yellow powder. $^1$H NMR (500 MHz, DMSO-d6) δ 9.74 (s, 1H, NH), 9.60 (s, 1H, NH), 8.36-8.21 (m, 5H, 5×ArH), 8.15 (dd, J=9.0, 2.7 Hz, 1H, ArH), 7.73-7.62 (m, 3H, 3×ArH), 7.49 (dd, J=12.8, 7.9 Hz, 2H, 2×ArH). $^{13}$C NMR (126 MHz, DMSO) δ 144.16 (ArC), 142.99 (ArC), 142.27 (ArC), 140.77 (ArC), 140.29 (ArC), 140.02 (ArC), 135.04 (ArC), 130.01 (ArCH), 129.97 (ArCH), 129.53 (ArC), 126.26 (ArCH), 125.32 (ArC), 124.64 (ArCH), 124.18(ArCH), 120.76 (ArCH), 119.86 (ArCH), 119.79 (ArCH), 119.42 (ArCH), 117.28 (ArCH), 116.75 (ArCH). UPLC-MS: $t_R$ 2.344 min. MS (ESI)$^+$ m/z calculated 494.37 [M+H]$^+$, observed 494.15 [M+H]$^+$.

Synthesis of 6-nitro-$N^2$, $N^3$-bis(4-(trifluoromethyl)phenyl)quinoxaline-2,3-diamine (Compound 11)

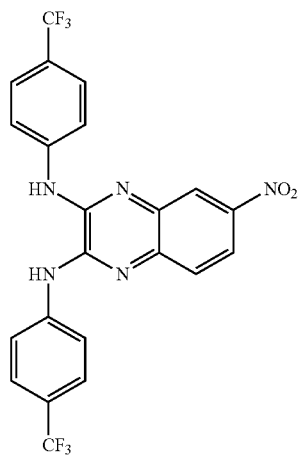

(11)

Chemical Formula: $C_{22}H_{13}F_6N_6O_2$, Molecular Weight: 493.37

Prepared according to Standard Procedure 1a, compound 11 was synthesised from 2,3-dichloroquinoxaline 2 (0.20 g, 0.85 mmol) and 4-(trifluoromethyl) aniline (0.69 g, 4.25 mmol) in DMSO (10 ml) for 30 min at 130° C. The work-up of the reaction was performed similarly to compound 1. The crude product was purified by automated flash column chromatography eluting with n-hexane:EtOAc 100:0 v/v increasing to 80:20 v/v in 12 CV. The final product 11 was obtained at 50% yield as a yellow powder. $^1$H NMR (500 MHz, DMSO-d6) δ 9.74 (s, 1H, NH), 9.61 (s, 1H, NH), 8.34 (s, 1H, ArH), 8.18-8.07 (m, 5H, 5×ArH), 7.77 (d, J=8.3 Hz, 4H, 4×ArH), 7.68 (d, J=8.9 Hz, 1H, ArH). $^{13}$C NMR (126 MHz, DMSO) δ 144.22 (ArC), 143.16 (ArC), 142.87 (ArC), 142.79 (ArC), 142.07 (ArC), 140.67 (ArC), 135.03 (ArC), 125.90 (5×ArCH), 123.06 (ArCF$_3$), 122.81 (ArCF$_3$), 120.94 (3×ArCH), 120.42 (2×ArCH), 119.78 (ArCH). UPLC-MS: $t_R$ 2.357 min. MS (ESI)$^+$ m/z calculated 494.371_[M+H]$^+$, observed 494.13 [M+H]$^+$.

Synthesis of $N^2$, $N^3$-bis(4-methoxy-3-(trifluoromethyl)phenyl)-6-nitroquinoxaline-2,3-diamine (Compound 12)

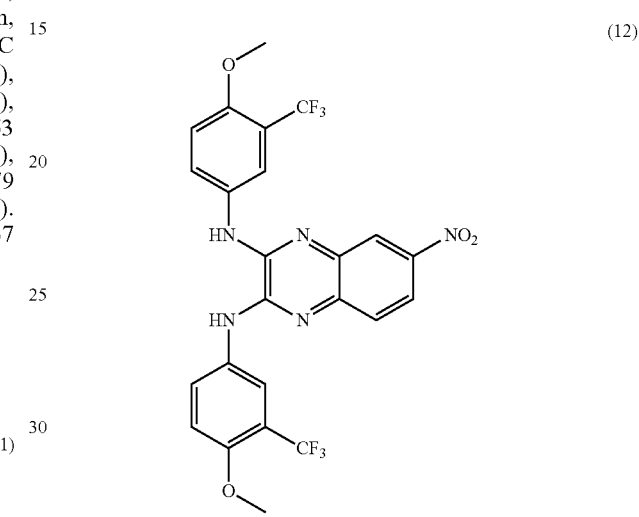

(12)

Chemical Formula: $C_{24}H_{17}F_6N_5O_4$, Molecular Weight: 553.42

According to Standard Procedure 1a, compound 12 was prepared from 2,3-dichloroquinoxaline 2 (0.16 g, 0.61 mmol) and 4-methoxy-3-(trifluoromethyl) aniline (0.58 g, 3.05 mmol) in DMSO (8 ml) for 30 min at 130° C. The work-up of the reaction was performed similarly to compound 1. The crude product was purified by automated flash column chromatography eluting with n-hexane:EtOAc 100:0 v/v increasing to 50:50 v/v in 10 CV. The final product 12 was obtained at 88% yield as an orange powder. $^1$H NMR (500 MHz, DMSO-d6) δ 9.50 (s, 1H, NH), 9.34 (s, 1H, NH), 8.28-8.03 (m, 6H, 6×ArH), 7.55 (d, J=8.8 Hz, 1H, ArH), 7.35 (d, J=9.1 Hz, 2H, 2×ArH), 3.92 (s, 3H, CH$_3$), 3.91 (s, 3H, CH$_3$). $^{13}$C NMR (126 MHz, DMSO) δ 153.16 (ArC—OCH$_3$), 152.86 (ArC—OCH$_3$), 143.68 (ArC), 142.99 (ArC), 142.31 (ArC), 141.01 (ArC), 135.07 (ArC), 132.16 (ArC), 131.83 (ArC), 126.92 (ArCH), 126.53 (ArCH), 125.80 (ArCH), 124.70 (ArCF$_3$), 122.57 (ArCF$_3$), 120.35 (ArCH), 119.96 (ArCH), 119.44 (ArCH), 119.29 (ArCH), 116.73 (ArC), 116.50 (ArC), 113.37 (ArCH), 113.36 (ArCH), 56.28 (2×CH$_3$). UPLC-MS: $t_R$ 2.273 min. MS (ESI)$^+$ m/z calculated 554.42 [M+H]$^+$, observed 554.13 [M+H]$^+$.

Synthesis of N², N³-dibenzyl-6-nitroquinoxaline-2,3-diamine (Compound 13)

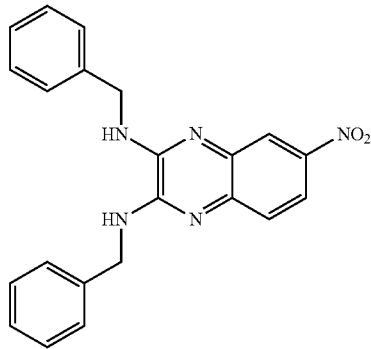

(13)

Chemical Formula: $C_{22}H_{19}N_5O_2$, Molecular Weight: 385.43

Prepared according to Standard Procedure 1a, compound 13 was synthesised from 2,3-dichloroquinoxaline 2 (0.13 g, 0.51 mmol) and phenylmethanamine (0.27 g, 2.5 mmol) in DMSO (6 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 10 CV. The final product 13 was obtained at 65% yield as an orange powder. ¹H NMR (500 MHz, DMSO-d6) δ 8.16 (d, J=2.6 Hz, 1H, ArH), 8.09 (t, J=5.2 Hz, 1H, NH), 7.97 (dd, J=8.9, 2.7 Hz, 1H, ArH), 7.85 (t, J=5.2 Hz, 1H, NH), 7.51 (d, J=8.9 Hz, 1H, ArH), 7.46-7.39 (m, 4H, ArH), 7.36 (t, J=7.6 Hz, 4H, ArH), 7.30-7.25 (m, 2H, ArH), 4.76 (d, J=5.2 Hz, 2H, CH₂), 4.73 (d, J=5.1 Hz, 2H, CH₂). ¹³C NMR (126 MHz, DMSO) δ 145.08 (ArC), 144.39 (ArC), 142.59 (ArC), 141.92 (ArC), 138.68 (ArC), 138.42 (ArC), 135.58 (ArC), 128.43 (2×ArCH), 128.40 (2×ArCH), 128.13 (2×ArCH), 128.12 (2×ArCH), 127.20 (ArCH), 127.13 (ArCH), 125.04 (ArCH), 119.77 (ArCH), 118.01 (ArCH), 44.50 (2×CH₂). UPLC-MS: $t_R$ 2.186 min. MS (ESI)⁺ m/z calculated 386.43 [M+H]⁺, observed 386.32 [M+H]⁺.

Synthesis of 6-nitro-N², N³-diphenethylquinoxaline-2,3-diamine (Compound 15)

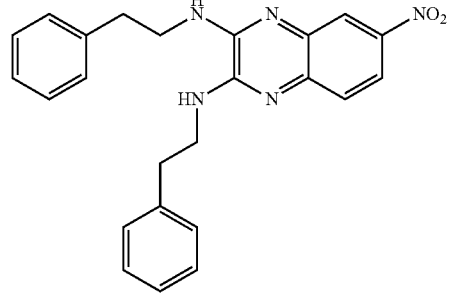

(14)

Chemical Formula: $C_{24}H_{23}N_5O_2$, Molecular Weight: 413.48

According to Standard Procedure 1a, compound 14 was prepared from 2,3-dichloroquinoxaline 2 (0.12 g, 0.49 mmol) and 2-phenylethan-1-amine (0.30 g, 2.5 mmol) in DMSO (6 ml) for 30 min at 130° C. The work-up of the reaction was performed similarly to compound 1. The crude product was purified by automated flash column chromatography eluting with n-hexane:EtOAc 100:0 v/v increasing to 70:30 v/v in 10 CV. The final product 14 was obtained at 75% yield as an orange powder. ¹H NMR (500 MHz, DMSO-d6) δ 8.18 (d, J=2.7 Hz, 1H, ArH), 7.97 (dd, J=8.9, 2.7 Hz, 1H, ArH), 7.67 (t, J=5.2 Hz, 1H, NH), 7.52 (d, J=8.9 Hz, 1H, ArH), 7.43 (t, J=5.1 Hz, 1H, NH), 7.34-7.26 (m, 8H, 8×ArH), 7.25-7.18 (m, 2H, 2×ArH), 3.73 (td, J=12.6, 6.6 Hz, 4H, 2×CH₂—N), 2.97 (dd, J=8.1, 6.6 Hz, 4H, 2×H₂). ¹³C NMR (126 MHz, DMSO) δ 145.18 (ArC), 144.48 (ArC), 142.48 (ArC), 141.96 (ArC), 139.58 (ArC), 139.46 (ArC), 135.58 (ArC), 128.74(2×ArCH), 128.73 (2×ArCH), 128.39 (2×ArCH), 128.38 (2×ArCH), 126.20 (ArCH), 126.16 (ArCH), 125.04 (ArCH), 119.83 (ArCH), 117.87 (ArCH), 42.61 (CH₂), 42.57 (CH₂), 34.20 (CH₂), 34.15 (CH₂). UPLC-MS: $t_R$ 2.271 min. MS (ESI)⁺ m/z calculated 414.48 [M+H]⁺, observed 414.35 [M+H]⁺.

Synthesis of N², N³-bis(3,4-dichlorophenyl)quinoxaline-2,3,6-triamine (compound 15)

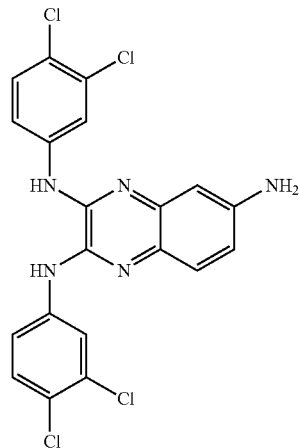

(15)

Chemical Formula: $C_{20}H_{13}Cl_4N_5$, Molecular Weight: 465.16

A mixture of compound 1 (0.24 g, 0.48 mmol) and 10% Pd/C (0.25 g) was stirred under hydrogen atmosphere at room temperature in EtOAc (24 ml) for 8 hours. After completion of the reaction, it was filtered through Celite. The filtrate was dried over anhydrous Na₂SO₄, filtered and reduced to dryness to give a crude product. The crude was purified by automated flash column chromatography eluting with n-hexane:EtOAc 100:0 v/v increasing to 50:50 v/v in 15 CV. The final product 15 was obtained at 50% yield as a yellow powder. ¹H NMR (500 MHz, DMSO-d6) δ 9.06 (s, 1H, NH), 8.88 (s, 1H, NH), 8.36 (d, J=2.5 Hz, 1H, ArH), 8.14 (d, J=2.6 Hz, 1H, ArH), 7.78 (dd, J=8.9, 2.6 Hz, 1H, ArH), 7.70 (dd, J=8.9, 2.6 Hz, 1H, ArH), 7.61 (d, J=8.8 Hz, 1H, ArH), 7.56 (d, J=8.8 Hz, 1H, ArH), 7.34 (d, J=8.7 Hz, 1H, ArH), 6.83 (dd, J=8.8, 2.5 Hz, 1H, ArH), 6.72 (d, J=2.4 Hz, 1H, ArH), 5.42 (s, 2H, NH$_2$). $^{13}$C NMR (126 MHz, DMSO) δ 147.98 (ArC), 141.44 (ArC), 140.98(ArC), 140.83 (ArC), 137.91(ArC), 137.21 (ArC), 130.76 (ArC), 130.37 (2×ArCH), 128.38 (ArC), 126.31 (ArCH), 122.97 (ArC), 122.12 (ArC), 120.63 (ArCH), 119.83 (ArCH), 119.74 (ArCH), 118.98 (ArCH), 116.86 (ArCH), 105.85 (ArCH). UPLC-MS: t$_R$ 2.66 min. MS (ESI)$^+$ m/z calculated 466.16 [M+H]$^+$, observed 464.07-466.04-468.05 [M+H]$^+$.

Synthesis of N$^2$, N$^3$-bis(3,4-dichlorophenyl)-6-(pyrrolidin-1-yl)quinoxaline-2,3-diamine (Compound 16)

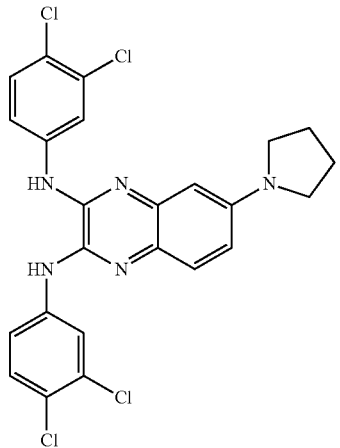

Chemical Formula: C$_{24}$H$_{19}$Cl$_4$N$_5$, Molecular Weight: 519.25

Compound 16 was prepared adding dibromobutane (0.03 g, 0.14 mmol, 2.2 eq.) to a mixture of compound 15 (0.03 g, 0.06 mmol, 1 eq.), anhydrous K$_2$CO$_3$ (0.01 g, 0.07 mmol, 1.1 eq.) in CH$_3$C (2 ml). The reaction mixture was irradiated at 150° C. for 15 min. After complete reaction, the mixture was filtered with EtOAc (20 ml). The results organic phase was washed with saturated aqueous NaHCO$_3$ (3×5 ml) and brine (10 ml). The organic layer then dried over anhydrous Na$_2$SO$_4$, filtered and reduced to dryness to give a crude product. The crude was purified by automated flash column chromatography eluting with n-hexane:EtOAc 100:0 v/v increasing to 80:20 v/v in 10 CV. The final product 16 was obtained at 28% yield as a brown powder. $^1$H NMR (500 MHz, DMSO-d6) δ 9.12 (s, 1H, NH), 8.97 (s, 1H, NH), 8.27 (d, J=2.6 Hz, 1H, ArH), 8.19 (d, J=2.5 Hz, 1H, ArH), 7.94 (dd, J=8.9, 2.5 Hz, 1H, ArH), 7.78 (dd, J=8.9, 2.5 Hz, 1H, ArH), 7.67 (d, J=8.8 Hz, 1H, ArH), 7.62 (d, J=8.8 Hz, 1H, ArH), 7.51 (d, J=8.9 Hz, 1H, ArH), 6.93 (dd, J=9.0, 2.6 Hz, 1H, ArH), 6.61 (d, J=2.6 Hz, 1H, ArH), 3.35 (t, J=6.6 Hz, 4H, 2×CH$_2$), 2.04-1.96 (m, 4H, 2×CH$_2$). $^{13}$C NMR (126 MHz, DMSO) δ 145.75 (ArC), 141.34 (ArC), 141.20 (ArC), 140.63 (ArC), 138.11 (ArC), 136.89 (ArC), 131.13 (ArC), 131.04 (ArC), 130.72 (ArCH), 130.58 (ArCH), 128.61 (ArC), 126.51 (ArCH), 124.09 (ArC), 122.91 (ArC), 121.69 (ArCH), 120.62 (ArCH), 120.43 (ArCH), 119.49 (ArCH), 114.87 (ArCH), 105.12 (ArCH), 48.97 (2×CH$_2$), 25.01 (2×CH$_2$). UPLC-MS: t$_R$ 2.707 min. MS (ESI)$^+$ m/z calculated 520.25 [M+H]$^+$, observed 515.95-518.05-591.13 [M+H]$^+$.

Synthesis of N-(2,3-bis((3,4-dichlorophenyl)amino)quinoxalin-6-yl)acetamide (compound 17)

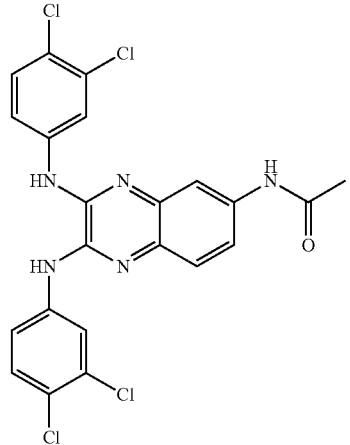

Chemical Formula: C$_{22}$H$_{15}$Cl$_4$N$_5$O, Molecular Weight: 507.20

According to Standard Procedure 1b, compound 17 was prepared adding dropwise acetyl chloride (0.01 g, 0.13 mmol) to a solution of anhydrous DCM (4 ml) containing compound 15 (0.06 g, 0.12 mmol) and anhydrous pyridine (0.03 g, 0.43 mmol) under a nitrogen atmosphere. The resulting mixture was stirred at room temperature for 1 hour. After completion, the reaction was diluted with DCM (10 ml) and quenched with saturated aqueous NaHCO$_3$ (15 ml). The organic phase was washed with saturated aqueous NaHCO$_3$ (3×10 ml) and brine (15 ml) respectively. The organic layer then dried over anhydrous Na$_2$SO$_4$, filtered and reduced to dryness to give a crude product. The crude product was purified by automated flash column chromatography eluting with n-hexane:EtOAc 100:0 v/v increasing to 50:50 v/v in 10 CV. The final product 17 was obtained at 52% yield as a pale-yellow powder. $^1$H NMR (500 MHz, DMSO-d6) δ 10.11 (s, 1H, NH—C=O), 9.23 (s, 1H, NH), 9.15 (s, 1H, NH), 8.31 (d, J=2.5 Hz, 1H, ArH), 8.24 (d, J=2.6 Hz, 1H, ArH), 8.00 (d, J=2.1 Hz, 1H, ArH), 7.81 (ddd, J=9.3, 6.9, 2.5 Hz, 2H, 2×ArH), 7.63 (dd, J=18.7, 8.8 Hz, 2H, 2×ArH), 7.58-7.50 (m, 2H, 2×ArH), 2.09 (s, 3H, CH$_3$). $^{13}$C NMR (126 MHz, DMSO) δ 168.38 (C=O), 141.15 (ArC), 140.64 (ArC), 140.43 (ArC), 139.82 (ArC), 137.46 (ArC), 136.30 (ArC), 132.18 (ArC), 130.79 (2×ArC), 130.47 (ArCH), 130.43 (ArCH), 125.78 (ArCH), 123.52 (ArC), 123.20 (ArC), 121.04 (ArCH), 120.78 (ArCH), 120.05 (ArCH), 119.81 (ArCH), 118.78 (ArCH), 113.96 (ArCH), 24.12 (CH$_3$). UPLC-MS: t$_R$ 2.195 min. MS (ESI)$^+$ m/z calculated 508.20 [M+H]$^+$, observed 506.10-508.02-510.04 [M+H]$^+$.

Synthesis of N-(2,3-bis((3,4-dichlorophenyl)amino)quinoxalin-6-yl)hexanamide (compound 18)

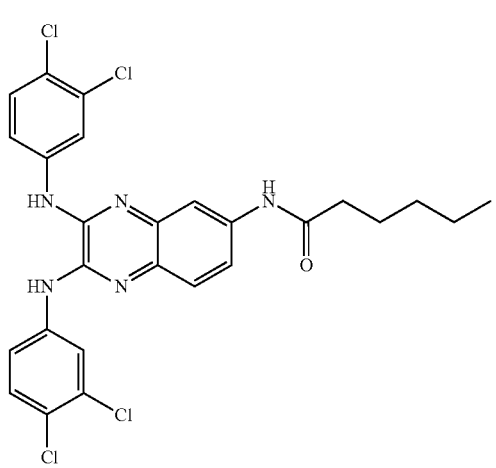

Chemical Formula: $C_{26}H_{23}Cl_4N_5O$, Molecular Weight: 563.30

Compound 18 was synthesised according to Standard Procedure 1b by addition dropwise of hexanoyl chloride (0.02 g, 0.12 mmol) to a solution of anhydrous DCM (5 ml) containing compound 15 (0.05 g, 0.11 mmol) and anhydrous pyridine (0.03 g, 0.39 mmol) under a nitrogen atmosphere. The resulting mixture was stirred at room temperature for 1 hour. The work-up of the reaction was performed similarly to compound 17. The crude product was purified by automated flash column chromatography eluting with n-hexane:EtOAc 100:0 v/v increasing to 70:30 v/v in 10 CV. The final product 18 was obtained at 66% yield as a brown powder. $^1$H NMR (500 MHz, DMSO-d6) δ 10.04 (s, 1H, NH—C=O), 9.24 (s, 1H, NH), 9.17 (s, 1H, NH), 8.33 (d, J=2.6 Hz, 1H, ArH), 8.25 (d, J=2.5 Hz, 1H, ArH), 8.05 (d, J=2.2 Hz, 1H, ArH), 7.82 (ddd, J=13.8, 8.9, 2.5 Hz, 2H, 2×ArH), 7.63 (dd, J=18.7, 8.8 Hz, 2H, 2×ArH), 7.59-7.51 (m, 2H, 2×ArH), 2.34 (t, J=7.4 Hz, 2H, CH$_2$), 1.62 (p, J=7.4 Hz, 2H, CH$_2$), 1.36-1.28 (m, 4H, 2×CH$_2$), 0.91-0.86 (m, 3H, CH$_3$). $^{13}$C NMR (126 MHz, DMSO) δ 171.39 (C=O), 141.06 (ArC), 140.64 (ArC), 140.44 (ArC), 139.73 (ArC), 137.48 (ArC), 136.28 (ArC), 132.13 (ArC), 130.80 (ArC), 130.43 (ArCH), 130.39 (ArCH), 125.73 (ArCH), 123.50 (ArC), 123.20 (ArC), 120.98 (ArCH), 120.76 (ArCH), 119.99 (ArCH), 119.78 (ArCH), 118.84 (ArCH), 114.01 (ArCH), 36.49 (CH$_2$), 30.95 (CH$_2$), 24.84 (CH$_2$), 21.96 (CH$_2$), 13.90 (CH$_3$). UPLC-MS: $t_R$ 2.429 min. MS (ESI)$^+$ m/z calculated 564.30 [M+H]$^+$, observed 562.04-564.08-566.01 [M+H]$^+$.

Synthesis of N-(2,3-bis((3,4-dichlorophenyl)amino)quinoxalin-6-yl)furan-2-carboxamide (compound 19)

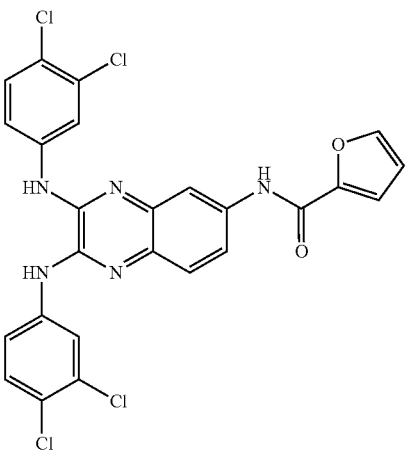

Chemical Formula: $C_{26}H_{16}C_{14}N_6O_2$, Molecular Weight: 559.23

According to Standard Procedure 1b, compound 19 was prepared adding dropwise furan-2-carbonyl chloride (0.02 g, 0.14 mmol) to a solution of anhydrous DCM (4 ml) containing compound 15 (0.06 g, 0.13 mmol) and anhydrous pyridine (0.04 g, 0.47 mmol) under a nitrogen atmosphere. The resulting mixture was stirred at room temperature for 1 hour. The work-up of the reaction was performed similarly to compound 17. The crude product was purified by automated flash column chromatography eluting with n-hexane:EtOAc 100:0 v/v increasing to 70:30 v/v in 10 CV. The final product 19 was obtained at 55% yield as a yellow powder. $^1$H NMR (500 MHz, DMSO-d6) δ 10.35 (s, 1H, NH—C=O), 9.26 (s, 1H, NH), 9.20 (s, 1H, NH), 8.35 (d, J=2.5 Hz, 1H, ArH), 8.26 (d, J=2.5 Hz, 1H, ArH), 8.14 (d, J=2.3 Hz, 1H, ArH), 7.96 (dd, J=1.8, 0.8 Hz, 1H, ArH), 7.83 (dt, J=8.9, 2.0 Hz, 3H, 3×ArH), 7.69-7.55 (m, 3H, 3×ArH), 7.39 (dd, J=3.5, 0.9 Hz, 1H, ArH), 6.72 (dd, J=3.5, 1.7 Hz, 1H, ArH). $^{13}$C NMR (126 MHz, DMSO) δ 156.61 (C=O), 147.88 (ArC), 146.23 (ArCH), 141.57 (ArC), 140.97 (ArC), 140.80 (ArC), 140.45 (ArC), 137.07 (ArC), 136.55 (ArC), 133.03 (ArC), 131.20 (ArC), 130.85(ArCH), 130.83 (ArCH), 126.07 (ArCH), 123.95 (ArC), 123.70 (ArC), 121.45 (ArCH), 121.26(ArCH), 120.47 (ArCH), 120.28 (ArCH), 120.18(ArCH), 115.79(ArCH), 115.20 (ArCH), 112.59 (ArCH). UPLC-MS: $t_R$ 2.297 min. MS (ESI)$^+$ m/z calculated 560.23 [M+H]$^+$, observed 557.99-559.93-561.85 [M+H]$^+$.

Compounds 20 and 21 having the structures shown below were commercially obtained from SPECS.

(20)

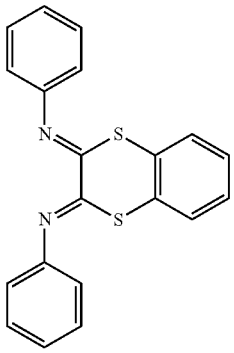

(21)

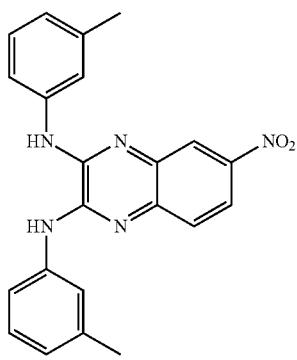

Comparative compounds "Comp. 1" (prepared by similar methods to those described above), "Comp. 2" (obtained from Sigma-Aldrich) and "Comp. 3" (obtained from Sigma-Aldrich) were included in the experiments described below as comparative examples. The results produced by these compounds are shown in Table 1 (first two rows). Compound "Comp. 1" has the following structure.

(Comp. 1)

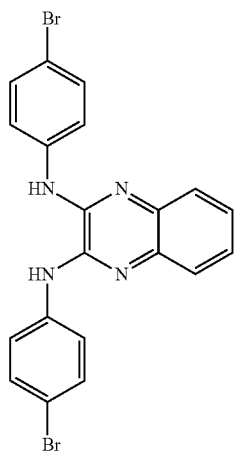

Compound "Comp. 2" is praziquantel, the known treatment for Schistosomiasis in humans, having the following structure:

(Comp. 2)

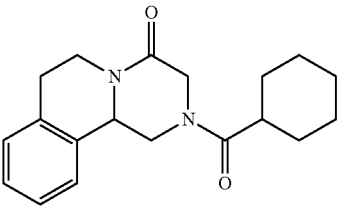

Compound "Comp. 3" is triclabendazole (Tbz) which is a known anti-parasitic with the following structure:

(Comp. 3)

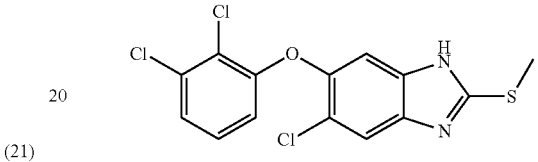

Biological Screening

72 Hours Schistosomula Drug Screen

S. mansoni (Puerto Rican Strain, Naval Medical Research Institute—NMRI) cercariae were collected from infected Biomphalaria glabrata (NMRI) snails after exposure to 2 hours of light at 26° C. and then mechanically transformed into schistosomula as described in D. G. Colley, S. K. Wikel, Schistosoma mansoni: simplified method for the production of schistosomules., Exp. Parasitol. 35 (1974) 44-51. Newly transformed schistosomula were prepared for 72 hour high throughput screening (HTS) in 384-well black-sided microtiter plates (Perkin Elmer, MA, USA) as described in M. Nur-e-alam, M. Yousaf, S. Ahmed, E. S. Al-sheddi, I. Parveen, D. M. Fazakerley, A. Bari, H. A. Ghabbour, M. D. Threadgill, K. C. L. Whatley, K. F. Ho, A. J. Al-rehaily, Neoclerodane Diterpenoids from Reehal Fatima, Teucrium yemense, J. Nat. Prod. 80 (2017) 1900-1908, with a final DMSO concentration of 0.625%. The effect of compounds on 72 hour cultured schistosomula was deduced by analysing the effect on both motility and phenotype of treated schistosomula using the image analysis model described by Paveley, R., Mansour, N., Hallyburton, I., Bleiche, L., Alex, E., Mikic, I., Guidi, A., H Gilbert, I., L Hopkins, A., D Bickle, Q., in "Whole Organism High-Content Screening by Label-Free, Image-Based Bayesian Classification for Parasitic Diseases", PLoS Negl Trop Dis 6(7): e1762 (2012). The data obtained in this manner is shown in Table 1 in the columns labelled "Phenotype", "Motility" and "Schistosomula average".

Juveniles Drug Screen

Juvenile 3 wk old worms were obtained by the perfusion of outbred mice (TO or MF-1) percutaneously infected three weeks earlier with 4,000 S. mansoni cercaria. Juvenile worm screens (15-20 worms/well) were performed in a 96 well plate format (flat bottom) containing a final volume of 200 µL of media (DMEM (Gibco, Paisley, UK) supplemented with 10% v/v Hepes (Sigma-Aldrich, Gillingham, UK), 10% v/v Foetal Bovine Serum (Gibco, Paisley, UK), 0.7% v/v 200 mM L-Glutamine (Gibco, Paisley, UK) and 1× v/v penicillin-streptomycin (Fisher Scientific, UK)) as previously described in Padalino G, Ferla S, Brancale A, Chalmers I W, Hoffmann K F. Int J Parasitol Drugs Drug Resist.

2018 December; 8(3):559-570. The data obtained in this manner is shown in Table 1 in the columns labelled "Juveniles".

Adult Worm Drug Screen

Mice (MF-1 mice, Harlan, UK), infected 7 weeks previously with 180 cercaria, were euthanised with an intraperitoneal injection of phenobarbital/heparin solution. Adult worms were recovered by perfusion of the portal system and subjected to drug screening as previously described in Padalino G, Ferla S, Brancale A, Chalmers I W, Hoffmann K F. Int J Parasitol Drugs Drug Resist. 2018 December; 8(3):559-570; in Whiteland H L, Chakroborty A, Forde-Thomas J E, Crusco A, Cookson A, Hollinshead J, Fenn C A, Bartholomew B, Holdsworth P A, Fisher M, Nash R J, Hoffmann K F. Int J Parasitol Drugs Drug Resist. 2018 December; 8(3):465-474; and in Crusco A, Bordoni C, Chakroborty A, Whatley K C L, Whiteland H, Westwell A D, Hoffmann K F. Eur J Med Chem. 2018 May 25; 152: 87-100. The data obtained in this manner is shown in Table 1 in the columns labelled "Adult worm".

Regarding the quantification of drug treatment on adult worms (e.g. decreased activity, paralysis or sluggishness), two different approaches were used, as described below. Where egg deposition was noticed, eggs were removed and counted using a Sedgewick rafter slide.

WHO Scoring Function

Adult worms were scored using the standardized microscopic WHO-TDR scoring system previously described by Ramirez, B., Bickle, Q., Yousif, F., Fakorede, F., Mouries, M.-A., Nwaka, S. in Schistosomes: Challenges in compound screening, Expert Opin Drug Discov. 2007 October; 2(s1): S53-61. This scoring system (0-4) identifies changes in worm movement and is defined according to the following scoring matrix: 0=no movement, 1=no movement with visible gut peristalsis, 2=minimal movement (occasional movement from anterior or posterior end of the worm), 3=slow continuous movement and 4=normal movement.

WormassayGP2

A digital image processing-based system was also used to assess parasite motility after drug treatment and is a modification of methods previously described by Marcellino C., Gut, J., Lim, K., Singh R., McKerrow, L. and Sakanari, J. WormAssay: a novel computer application for whole-plate motion-based screening of macroscopic parasites. PLoS Negl Trop Dis. 2012 January:6(1):e1494. This allowed for objective verification of the WHO method described above. The data obtained with this quantification method is shown in Table 1 in the columns labelled "Adult worm".

Schistosoma mansoni RNAi

Following the perfusion of 7-week infected mice, adult worms were recovered and RNAi performed as previously described in Geyer K K, Munshi S E, Whiteland H L, Fernandez-Fuentes N, Phillips D W, Hoffmann K F. PLoS Pathog. 2018 Jun. 28; 14(6):e1007107 and Padalino G, Ferla S, Brancale A, Chalmers I W, Hoffmann K F. Int J Parasitol Drugs Drug Resist. 2018 December; 8(3):559-570. Briefly, smp 138030 and non-specific Luciferase siRNA duplexes were purchased from Sigma (siSmp_138030=CGUUUGGUCCCAUCGGACA[dT][dT] and UGUCCGAUGGGACCAAACG[dT][dT]; siLuc=CUUACGCUGAGUACUUCGA[dT][dT] and UCGAAGUACUCAGCGUAAG[dT][dT]). Mixed sex adult worm pairs (for knockdown assessment by quantitative reverse transcription PCR, qRT-PCR) were cultured at 37° C. in DMEM supplemented with 10% fetal calf serum, 2 mM L-glutamine, 10,000 Units/ml penicillin and 10,000 µg/ml streptomycin in an atmosphere of 5% $CO_2$ with a 70% media exchange performed every 48 hr. Quantitative reverse transcription PCR (qRT-PCR) of smp_138030 abundance was performed at 48 hr and adult worm motility [39] as well as egg counts were quantified at 168 hr. Levels of H3K4me detected in schistosome histone extracts were assessed at 72 hr.

Quantitative Reverse Transcription PCR (qRT-PCR)

Following RNAi with siSmp 138030 and siLuc, mixed-sex adult worms were incubated for a total of 48 hr before processing them for RNA isolation. Briefly, worms were homogenised using a TissueLyser LT (Qiagen, UK) in TRIzol Reagent (Invitrogen, UK) before isolation of total RNA using the Direct-zol RNA Kit (Epigentek, UK). cDNA was then generated using the SensiFAST cDNA synthesis kit (Bioline), qRT-PCR performed and data analysed as previously described in Padalino G, Ferla S, Brancale A, Chalmers I W, Hoffmann K F. Int J Parasitol Drugs Drug Resist. 2018 December; 8(3):559-570. qRT-PCR primers for amplifying smp_138030 (Forward primer FW: 5'-GTC-TACCGGGTGTTCGACG-3', Reverse 5'-TC-CAAATCCCGTGCAGC-3') and internal standard alpha tubulin (SmAT1; Forward primer 5'-CGAAGCTTGGGCGCGTCTAGAT-3', Reverse 5'-CTAATACTCTTCACCTTCCCCT-3') were purchased from Sigma.

Histone Extraction and Detection of H3K4 Methylation

Drug or RNAi treated adult worms were separated by sex and transferred to fresh microcentrifuge tubes (with Snap Cap, 2 ml Capacity, Round Bottom). Total histone extraction from these worms was performed using EpiQuik™ Total Histone Extraction Kit (OP-0006, Epigentek) following the manufacturer's instructions.

The global histone H3-K4 methylation was measured using the EpiQuik™ Global Histone H3-K4 Methylation Assay Kit (P-3017-96) following the manufacturer's instructions.

Newly Excysted Juveniles (NEJs) Drug Screen

*F. hepatica* (Italian strain) metacercariae were obtained from Ridgeway Research, Gloucestershire, UK and stored at 4° C. Newly excysted juveniles (NEJs) from metacercariae were produced based on an optimisation introduced to the excystment method published by Dixon et al. and Wilson et al (Dixon, K. E., The physiology of excystment of the metacercaria of *Fasciola hepática* L. Parasitology, 1966, 56, 431-456. ; Wilson, L. R., Good, R. T., Panaccio, M., Wijffels, G. L., Sandeman, R. M., Spithill, T. W, *Fasciola hepatica*: Characterization and Cloning of the Major Cathepsin B Protease Secreted by Newly Excysted Juvenile Liver Fluke. Experimental Parasitology 1998, 88, 85-94).

After excystment, NEJs were distributed into a 24 well tissue culture plate at a density of 25 parasites per well containing 1 mL of pre-warmed NEJs culture media. Compounds were added to respective wells and NEJ/compound co-cultures were incubated at 37° C. in an atmosphere containing 5% $CO_2$ for 72 hours at a final concentration of 10 µM. The effect of the drug on the parasite phenotype and motility was independently scored using the scoring matrix as described previously in Edwards, J., Brown, M., Peak, E., Bartholomew, B., Nash, R. J., Hoffmann, K. F., The diterpenoid 7-keto-sempervirol, derived from Lycium chinense, displays anthelmintic activity against both *Schistosoma mansoni* and *Fasciola hepatica*, PLoS neglected tropical diseases 2015, 9, e0003604-e0003604.

MTT Assay on HepG2 Cells

Human Caucasian Hepatocyte Carcinoma (HepG2) cells (85011430, Sigma Aldrich) were used to assess the overt toxicity of these anti-infective compounds.

Briefly, HepG2 cells were treated with compounds for 24 hrs as previously described in Crusco A, Bordoni C, Chakroborty A, Whatley K C L, Whiteland H, Westwell A D, Hoffmann K F., Eur J Med Chem. 2018 May 25; 152:87-100. Each compound was used to dose the cells at different concentration points: 200, 100, 75, 50, 20, 10 and 1 µM, each of them in triplicate. Each compound solution was prepared in HepG2 culture media at double the concentration required for the cytotoxicity assay (200-2 µM for 100-1 µM final concentration). 50 µl of the compound solution was added to the corresponding well of the plate according to a predefined layout. Media and a DMSO controls (in triplicate as well) were prepared by addition of 50 µl of fresh media without compound and DMSO (1.25% v/v) respectively. A negative control (1% v/v Triton X-100; X100, Sigma-Aldrich) was also included in each screen. After addition of compounds, each plate was then incubated for a further 20 hrs before application of MTT reagent (prepared as described in Nur-E-Alam M, Yousaf M, Ahmed S, Al-Sheddi E S, Parveen I, Fazakerley D M, Bari A, Ghabbour H A, Threadgill M D, Whatley K C L, Hoffmann K F, Al-Rehaily A J, J Nat Prod. 2017 Jun. 23; 80(6):1900-1908 for the assessment of compound cytotoxicity using the MTT assay.

Following incubation with test compounds for 20 hrs, 10 µl (10% final volume) of 12 mM MTT reagent was added to each well. The plate was then further incubated for 4 hrs. After incubation, each plate was blotted dry under the laminar flow to remove the MTT treated culture media. A 100 µl DMSO: isopropanol (1:1) solution was then added to each well and the plate was then subsequently incubated for 10 minutes at 37° C. Following incubation, each plate was shaken again and then absorbance measured at 570 nm. The absorbance reading was corrected based on the average value of the wells used as blank (no cells). Dose response curves to calculate $CC_{50}$ values of the compounds tested were generated in GraphPad Prism 7.02 based on the average absorbance of the three replicates for each concentration.

The data obtained in this manner is shown in Table 1 in the columns labelled "HepG2". This data was also used to calculate a selectivity index of activity against schistosomula and adult worms over activity in the HepG2 assay (an indication of toxicity). The selectivity indexes for schistosomula and adult worms are shown in the final two columns in Table 1.

In vitro Determination of Antibacterial Activity

Bacteria strains of *Escherichia coli*—*E. coli*—ATCC 25922; *Staphylococcus aureus*—*S. aureus*—ATCC 29213; *Mycobacterium smegmatis*—*M. smegmatis* mc$^2$15—ATCC 700084, MRSA (USA300, ATCC 33591, EM RSA), *Pseudomonas aeruginosa*—ATCC 27853, *S. epidermidis*—NTCT11077, *B. cereus* strains were used for testing all the compounds, as previously described in "Untargeted metabolomics reveals a new mode of action of pretomanid (PA-824)", Baptista, Rafael, Fazakerley, David M., Beckmann, Manfred, Baillie, Les and Mur, Luis A. J. 2018. *Scientific Reports* 8 (1), 2018. Bacterial strains of *Enterococcus faecalis*—ATCC 29212, NCTC 12201, ATCC 51299; *Streptococcus pneumoniae*—ATCC 49619, 18778, 21394, 21395; *Haemophilus influenza*—ATCC 49766, 18391, 17428; *Staphylococcus aureus*—NCTC 12493, ATCC BAA-077, ATCC 700698, 11051; used for testing the compounds, as previously described in "Clinical laboratory testing and in vitro diagnostics test systems—Susceptibility testing of infectious agents and evaluation of performance of antimicrobial susceptibility devices—Part 1: Reference methods for testing the in vitro activity of antimicrobial agentes against bacteria involved in infectious diseases, ISO/FDIS 20776-1:2006(E). All the procedures were carried out in a biosafety containment level 2.

Anti-Schistosomal in vivo Efficacy Screen

An anti-schistosomal efficacy trial of the compounds described herein was conducted on a murine model of Schistosomiasis using the following procedure. *Schistosoma mansoni* cercaria were prepared from infected *Biomphalaria glabrata* snails by inducing synchronous shedding upon exposure to light for 40 minutes (in artificial pond water). Mice were infected percutaneously by exposing tails to 120 *S. mansoni* cercariae per mouse for a duration of 45 minutes [Smithers S, Terry R. The infection of laboratory hosts with cercariae of *Schistosoma mansoni* and the recovery of the adult worms. Parasitology. 1965; 55(4):695-700]. A maximum of 6 mice were housed in a cage for the duration of the 7-week infection.

At 6 wks post infection (Day 42 post infection), mice were dosed with anthelmintic chemicals using autoclaved gavage needles for oral delivery. The gavage needle was dipped into a concentrated solution of sucrose (approx. 1 g/ml) before dosing as a refinement measure to reduce stress-related reactions.

For oral dosing, the compounds (dry powder) were weighed and prepared in an appropriate excipient (e.g. 10% DMSO, 20% Kolliphor EL and 70% sterile water). Compound formulations were prepared fresh daily and any leftover discarded.

For each selected compound, a defined number of animals (in the range of 3-6) were dosed orally (e.g. dose level 100 mg/kg, dose volume 10 ml/kg). Each mouse was dosed once per day on two non-consecutive days (Day 42 and 44 post infection). Each mouse of the control treatment was dosed with only the vehicle (10% DMSO, 20% Kolliphor EL and 70% sterile water) at a dose volume of 10 ml/kg following the same dosing interval.

At the end of the treatment (on day 48 post-infection), mice were perfused after receiving an intra-peritoneal administration of non-recoverable dose of sodium pentobarbital (100 µl/10 g body weight) containing 100 U/ml heparin solution (in 1×PBS). Adult *S. mansoni* were obtained from each mouse by hepatic portal vein perfusion with pre-warmed (37° C.) perfusion media (DMEM supplemented with 0.1% 100 U/ml heparin solution in 1×PBS). Worms were collected in a sedimentation flask placed directly below the perfused animal. Following that, worms were washed by sedimentation with perfusion media first and then pre-warmed adult worm media (DMEM (Gibco, Paisley, UK) supplemented with 10% v/v FCS (Gibco, Paisley, UK), 1% v/v L-glutamine (Gibco, Paisley, UK) and an antibiotic mixture (150 Units/ml penicillin and 150 µg/ml streptomycin; Gibco, UK)) [as described in Crusco A, Whiteland H, Baptista R, Forde-Thomas J E, Beckmann M, Mur L A J, et al. Antischistosomal Properties of Sclareol and Its Heck-Coupled Derivatives: Design, Synthesis, Biological Evaluation, and Untargeted Metabolomics. ACS Infectious Diseases. 2019; 5(7):1188-99; Whatley K C L, Padalino G, Whiteland H, Geyer K K, Hulme B J, Chalmers I W, et al. The repositioning of epigenetic probes/inhibitors identifies new anti-schistosomal lead compounds and chemotherapeutic targets. PLOS Neglected Tropical Diseases. 2019; 13(11):e0007693; and Whiteland H, Chakroborty A, Forde-Thomas J, Crusco A, Cookson A, Hollinshead J, et al. An *Abeis procera*—Derived tetracyclic triterpene containing a steroid-like nucleus core and a lactone side chain attenuates in vitro survival of both *Fasciola hepatica* and *Schistosoma mansoni*. International Journal for Parasitology: Drugs and Drug Resistance. 2018; 8]. After incubation in a humidified environment containing 5% $CO_2$ at 37° C. for at least 1 h, the quantification of worm burden per each mouse of each treatment was performed.

Following perfusion, livers were removed and weighed before being placed into a 50 mL falcon tube to perform an overnight digestion by 4% KOH treatment (at 37° C.). Subsequent schistosome egg count (expressed as number of eggs per organ weight) was performed for each sample to assess any differences between the drug treated cage and the control cage (e.g. vehicle).

Tables 3 and 4 show that the many of the example compounds of the present invention are also effective in combatting *Staphylococcus aureus* and MRSA and therefore could provide effective treatments for infections of these organisms. Also, this data demonstrates that the example compounds may be effective in disinfecting surfaces, for example on surgical devices or implants, comprising pathogenic bacteria, such as *Staphylococcus aureus* and MRSA.

TABLE 1

| Compound | $EC_{50}$ (μM) | | | $EC_{50}$ (μM) Adult worm | $EC_{50}$ (μM) Juveniles | $CC_{50}$ (μM) HepG2 | Selectivity Index Schistosomula | Selectivity Index Adult |
|---|---|---|---|---|---|---|---|---|
| | Phenotype | Motility | Schistosomula average | | | | | |
| Comp. 1 | 2.21 | 1.22 | 1.71 | 0.14 | ND | 9.89 | 6 | 73 |
| Comp. 2 | 1.11 | 0.84 | 0.98 | 0.0107 | ND | >100 | — | — |
| 1 | 0.42 | 0.54 | 0.48 | 0.07 | 0.0771 | 7.40 | 15 | 107 |
| 4 | 0.40 | 0.53 | 0.47 | ND | ND | 13.05 | 28 | ND |
| 5 | 1.22 | 1.30 | 1.26 | 0.012 | ND | 6.76 | 5 | 568 |
| 6 | 2.14 | 1.40 | 1.77 | 0.18 | ND | 22.04 | 12 | 121 |
| 7 | 0.54 | 0.54 | 0.54 | 0.011 | ND | 7.75 | 14 | 705 |
| 8 | 0.37 | 0.43 | 0.40 | 0.0065 | ND | 10.07 | 25 | 1549 |
| 9 | 0.48 | 0.47 | 0.48 | 0.0036 | ND | 106.07 | 223 | 29464 |
| 10 | 0.38 | 0.57 | 0.48 | 0.0070 | ND | 5.85 | 12 | 836 |
| 11 | 0.42 | 0.53 | 0.48 | 0.0067 | ND | 15.55 | 33 | 2320 |
| 12 | 0.57 | 0.65 | 0.61 | 0.0085 | ND | 5.64 | 9 | 664 |
| 13 | 3.19 | 2.64 | 2.92 | ND | ND | 11.67 | 4 | ND |
| 14 | 2.20 | 1.47 | 1.84 | 0.20 | ND | 4.40 | 2 | 23 |
| 15 | 3.51 | 3.25 | 3.38 | ND | ND | 25.11 | 7 | ND |
| 16 | >10 | >10 | ND | ND | ND | ND | ND | ND |
| 17 | 2.60 | 2.09 | 2.35 | 0.70 | ND | 8.60 | 4 | 12 |
| 18 | 1.02 | 1.80 | 1.41 | 0.32 | ND | 64.75 | 46 | 203 |
| 19 | 2.54 | 1.33 | 1.94 | ND | ND | 14.84 | 8 | ND |
| 20 | 4.31 | 4.51 | 4.41 | ND | ND | 13.75 | 3 | ND |
| 21 | 1.62 | 1.23 | 1.42 | ND | ND | 15.58 | 11 | ND |

Results

The data obtained by the above methods for compounds 1 and 4-21 were converted into dose response curves to calculate $EC_{50}$ values of these compounds using GraphPad Prism 7.02, based on the average score for each concentration. Table 1 shows the anti-schistosomal screening data of compounds 1 and 4-21. Table 2 shows the activity of compounds 1, 4, 5, 7, 9-16, 18, 19 and Comp. 3 (Tbz) on newly excysted juveniles (NEJs) of *F. hepatica* against a DMSO and RPMI media control, wherein statistical evaluation of all treatment conditions was performed (compared to the DMSO control) using a Kruskal-Wallis Anova (followed by Dunn's post-hoc analysis test). Table 3 shows the antibacterial screening data for compounds 2, 5, 7, 10-14 and 16-19. Table 4 shows additional antibacterial screening data for compounds 2, 5, 7, 11, 12 and 19.

Table 1 demonstrates that the example compounds show a similar or improved activity against Schistosomula, juveniles and adult worms of *S. mansoni* than the comparative compounds "Comp. 1" and "Comp. 2", and that many of these compounds show a greater selectivity index over HepG2. The compounds of the present invention may therefore provide safe and effective treatments for infections of *S. mansoni* and also, by way of inhibition of homologous enzymes, treatments for *Fasciola hepatica*, *Plasmodium falciparum* and *Staphylococcus aureus* infections.

The data in Table 2 demonstrates that the example compounds show activity against *F. hepatica* NEJs, which is similar to or an improvement over compound Comp. 3 (Tbz).

TABLE 2

| Compound/control name | Phenotype (P) | | | Motility (M) | | |
|---|---|---|---|---|---|---|
| | Mean* | SD | Significance (compared to DMSO)** | Mean* | SD | Significance (compared to DMSO)** |
| DMSO | 1.48 | 0.96 | — | 1.36 | 0.64 | — |
| RPMI (media) | 1.44 | 0.77 | ns | 1.36 | 0.64 | ns |
| Comp. 3 (Tbz) | 4.72 | 0.46 | **** | 4.72 | 0.46 | **** |
| 1 | 5.00 | 0.82 | **** | 4.69 | 0.48 | **** |
| 4 | 5.13 | 0.85 | **** | 4.71 | 0.46 | **** |
| 5 | 4.70 | 0.98 | **** | 4.20 | 0.62 | **** |
| 7 | 5.00 | 0.69 | **** | 4.56 | 0.51 | **** |
| 9 | 4.63 | 0.96 | **** | 3.68 | 0.48 | *** |
| 10 | 2.76 | 0.97 | ns | 2.71 | 0.77 | ns |
| 11 | 4.28 | 0.83 | **** | 4.17 | 0.51 | **** |
| 12 | 4.70 | 0.86 | **** | 4.45 | 0.51 | **** |
| 13 | 3.14 | 0.35 | ns | 3.14 | 0.35 | ns |
| 14 | 4.27 | 1.28 | **** | 4.00 | 0.93 | **** |
| 15 | 5.09 | 0.61 | **** | 4.86 | 0.35 | **** |
| 16 | 2.95 | 1.22 | ns | 2.84 | 0.96 | ns |
| 18 | 4.09 | 0.43 | **** | 4.05 | 0.21 | **** |
| 19 | 3.40 | 0.87 | * | 3.36 | 0.76 | ** |

*Phenotype and motility scores recorded at 72 h are presented in the form of a mean score and standard deviation.
**Statistical evaluation of all treatment conditions was performed (compared to the DMSO control) using a Kruskal-Wallis Anova (followed by Dunn's post-hoc analysis test).

TABLE 3

All data points in Table 3 below are MIC90 values in ug/ml.

| Compound | E. coli ATCC 25922 | S. aureus ATCC 29213 | *M. smegmatis mc² 15 ATCC 700084 | 3 MRSA strains | | | Pseudomonas aeruginosa ATCC 27853 | S. epidermidis NTCT11077 | B. cereus |
|---|---|---|---|---|---|---|---|---|---|
| | | | | USA 300 | ATCC 33591 | EM RSA | | | |
| 2 | 62.5 | <3.91 | 1.95 | 15.63 | 15.63 | 15.63 | 125 | <62.50 | <62.50 |
| 5 | >125 | <3.91 | >125 | 3.91 | 3.91 | 3.91 | >125 | <62.5 | 125 |
| 7 | 62.5 | 1.95 | 62.5 | <3.91 | <3.91 | 7.81 | >125 | <62.5 | 125 |
| 10 | >125 | 7.81 | >125 | >125 | >125 | >125 | >125 | >125 | >125 |
| 11 | >125 | 0.98 | 31.25 | <3.91 | <3.91 | 3.91 | >125 | <62.5 | <62.5 |
| 12 | >125 | 62.5 | >125 | 15.63 | 31.25 | 31.25 | >125 | <62.5 | <62.5 |
| 13 | >125 | >125 | >125 | ND | ND | ND | ND | ND | ND |
| 14 | >125 | >125 | 31.25 | ND | ND | ND | ND | ND | ND |
| 16 | >125 | 15.63 | >125 | 62.5 | 31.25 | 62.5 | >125 | >125 | >125 |
| 17 | >125 | 62.5 | >125 | ND | ND | ND | >125 | <62.5 | <62.5 |
| 18 | >125 | 62.5 | >125 | ND | ND | ND | >125 | >125 | 125 |
| 19 | >125 | 31.25 | >125 | 62.5 | 15.63 | 62.5 | >125 | 125 | <62.5 |

TABLE 4

All data points in Table 4 below are MIC values in mg/l

| Organism ID | Reference strain | Resistances | Mechanism | Compound (MIC values in mg/l) | | | | | |
|---|---|---|---|---|---|---|---|---|---|
| | | | | 2 | 5 | 7 | 11 | 12 | 19 |
| Enterococcus faecalis | ATCC 29212 | — | — | 32 | 0.25 | 1 | 0.06 | 0.5 | 4 |
| Streptococcus pneumoniae | ATCC 49619 | — | — | 64 | 4 | 8 | 2 | 8 | 8 |
| Haemophilus influenzae | ATCC 49766 | — | — | 32 | 4 | >64 | 16 | 64 | 64 |
| Staphylococcus aureus | NCTC 12493 | Flucloxacillin | mecA | 16 | 0.06 | 0.5 | 0.125 | 1 | 1 |
| Staphylococcus aureus | ATCC BAA-977 | ERY/CLIND | MLSB | 32 | 0.125 | 0.5 | 0.125 | 1 | 8 |
| Staphylococcus aureus | ATCC 700698 | Vancomycin | hVISA | 32 | 0.125 | 0.5 | 0.125 | 1 | 8 |
| Staphylococcus aureus | 11051 | Tetracycline | — | 16 | 0.125 | 0.5 | 0.125 | 2 | 8 |
| Enterococcus faecalis | NCTC 12201 | Vancomycin | vanA | 8 | 0.06 | 0.5 | 0.06 | 0.5 | 0.25 |
| Enterococcus faecalis | ATCC 51299 | Vancomycin | vanB | 32 | 0.25 | 0.5 | 0.25 | 1 | 2 |
| Streptococcus pneumoniae | 18778 | ERY, TET | — | 64 | 8 | 32 | 4 | 16 | 8 |
| Streptococcus pneumoniae | 21394 | Penicillin | PBP | 64 | 4 | 32 | 4 | 8 | 8 |
| Streptococcus pneumoniae | 21395 | ERY, CLIND | MLSB | 64 | 4 | 8 | 2 | 8 | 8 |
| Haemophilus influenzae | 18391 | AMP/COA | PBP/β-lactamase | 32 | 8 | >64 | 16 | 64 | 64 |
| Haemophilus influenzae | 17428 | Ampicillin | PBP | 32 | 8 | >64 | 16 | >128 | 64 |

Homology Modelling and Compound Docking

Homology modelling of Smp_138030 (a protein lysine methyltransferase) and docking of compound 1 was performed as previously described Padalino G, Ferla S, Brancale A, Chalmers I W, Hoffmann K F. Int J Parasitol Drugs Drug Resist. 2018 December; 8(3):559-570. FIG. 1 shows molecular docking study results which supports the hypothetical mechanism of action of the compounds on a protein lysine methyltransferase enzyme (Smp_138030). The surface structure of Smp_138030 was presented with the histone protein as shown located in the substrate-binding pocket (highlighted with the dotted circle). The binding mode of compound 1 (a representative of the family of compounds of the present invention) was superimposed on the histone protein in the substrate-binding pocket to provide support to the putative mechanism of action of these compounds (Panel A). In Panel B, the surface structure of Smp_138030 was hidden to provide a better view of the natural substrate (histone protein) and the putative binding mode of the substrate-competitive inhibitor (compound 1).

Effect of Drug Treatment on the Parasite Epitope

Figure 2:
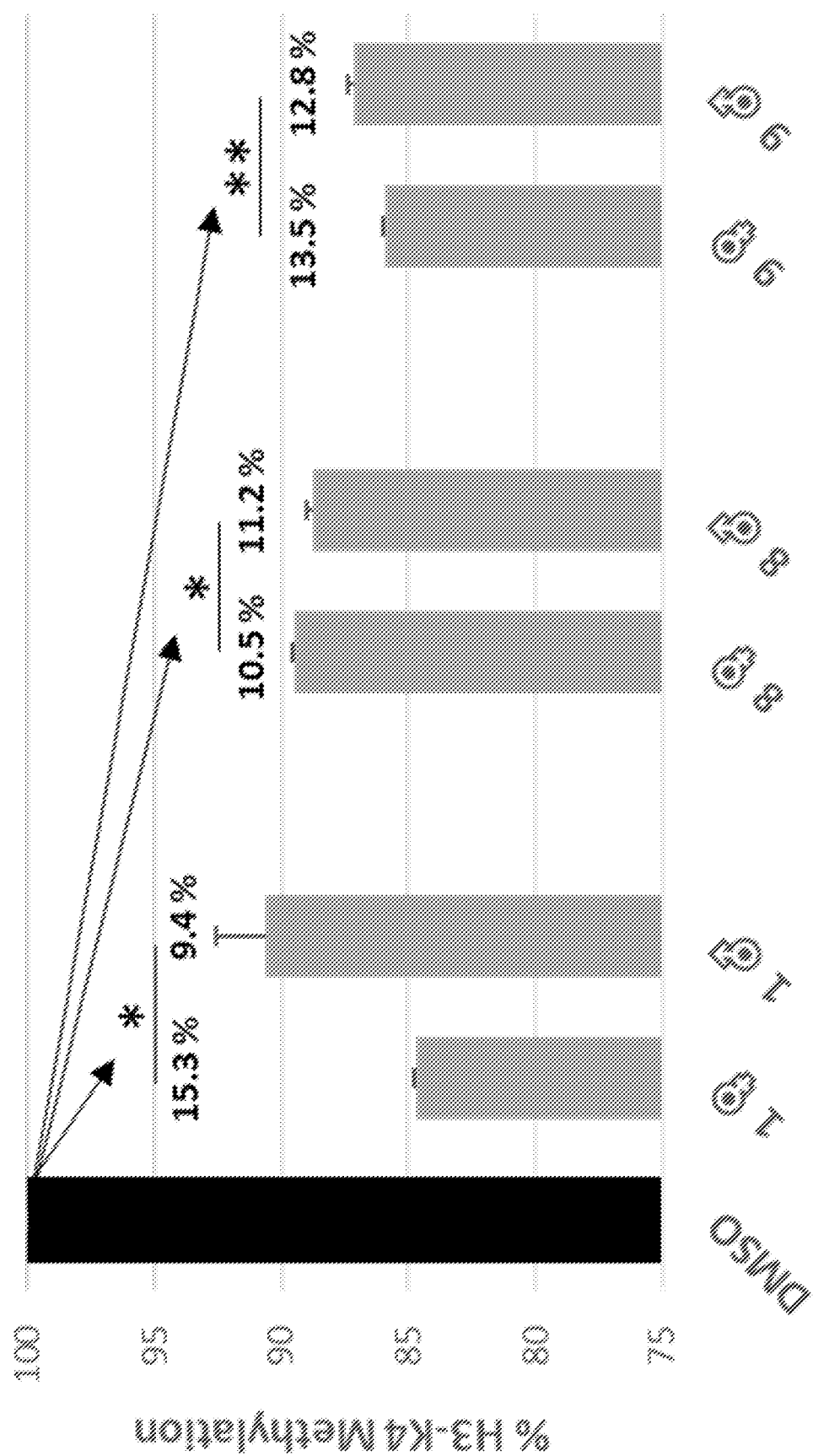
FIG. 2 shows decreased H3K4 methylation in compound treated worms (males and females, denoted by male and female symbols respectively).

FIG. 2 shows the effect of drug treatment (sub-lethal concentration of compounds 1-0.076 μM, 8 and 9-0.0024 μM) on methylation of H3K4 (Histone 3, lysine 4)). FIG. 2 shows decreased H3K4 methylation in compound treated worms (males and females, denoted by male and female symbols respectively). Each of the compounds tested produced a significant % decrease of global H3K4 methylation compared to the negative control (DMSO). However, there was no statistically significant difference between the gender (male and female adult worms) across the three treatments. A Kruskal-Wallis ANOVA followed by Dunn's multiple comparisons test was performed to compare each population mean (average of three different biological replicates) to the DMSO control. * and ** represent p<0.0163 and p<0.0076 respectively. This data supports the hypothesis that these compounds are inhibitors of protein lysine methyl transferase enzymes.

Figure 3A:
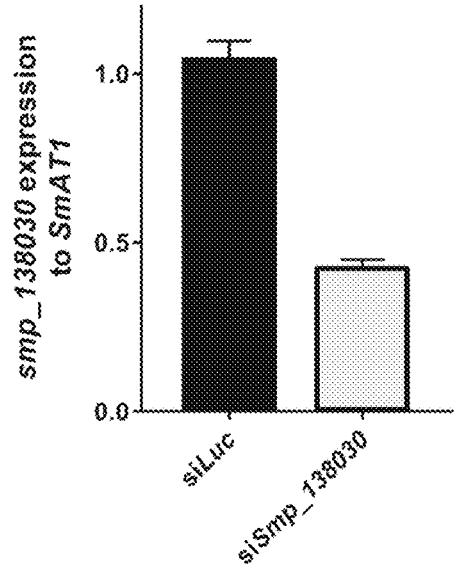
FIG. 3A-3C shows how RNAi-mediated knockdown of smp 138030 (a protein lysine methyltransferase) affects worm movement and the in vitro production of schistosome eggs.
Figure 3B:
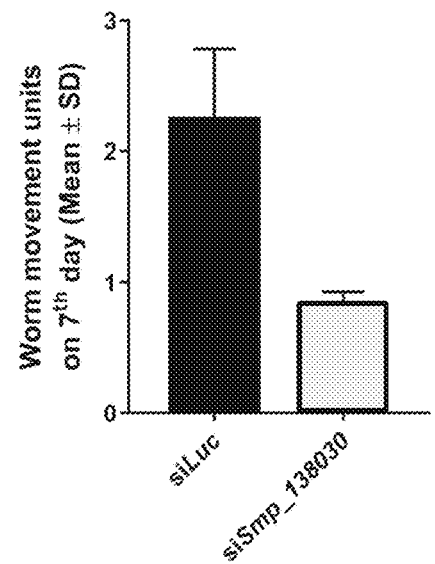
Figure 3C:
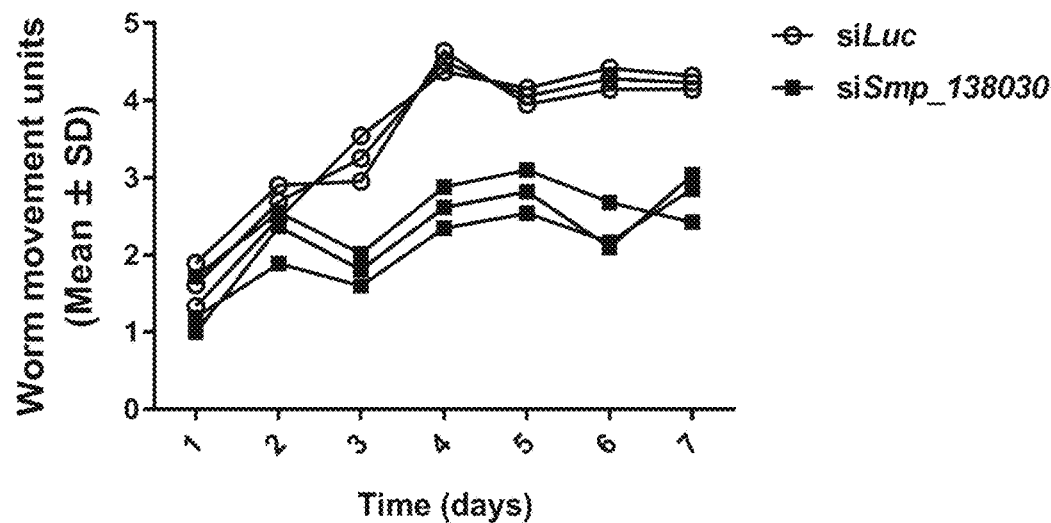
Figure 4A:
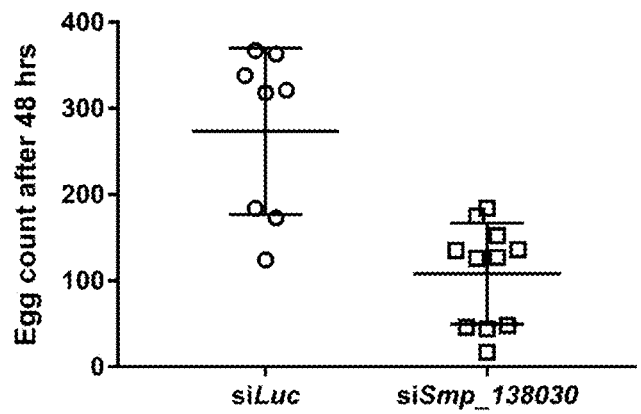
FIG. 4A-4C shows how RNAi-mediated knockdown of smp 138030 the in vitro production of schistosome eggs.
Figure 4B:
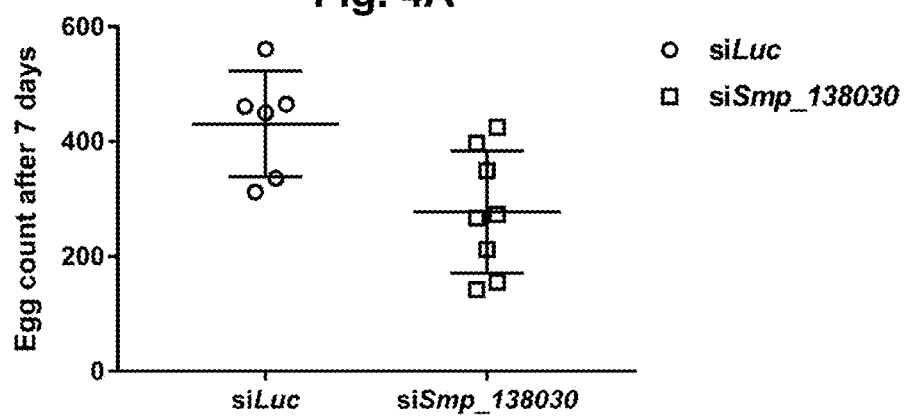
Figure 4C:
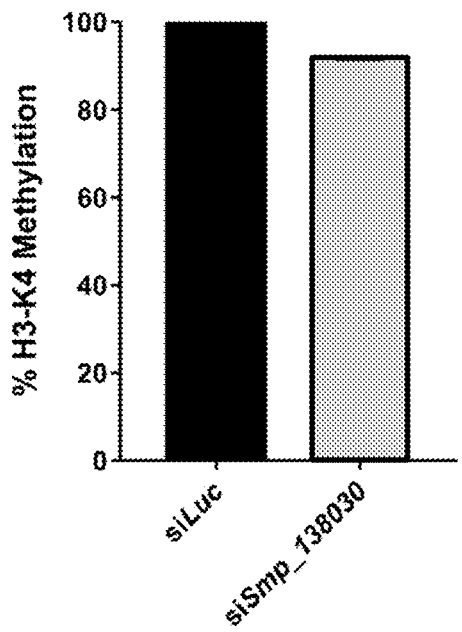

RNAi-mediated Knockdown of smp_138030 Affects Worm Movement and the in vitro Production of Schistosome Eggs FIGS. 3 and 4 show how RNAi-mediated knockdown of smp_138030 (a protein lysine methyltransferase) affects worm movement and the in vitro production of schistosome eggs. In Panel A, seven-week old adult male and female schistosomes were electroporated with 5 μg siRNA duplexes targeting luciferase (siLuc) or smp_138030 (siSmp_138030). Following 48 hrs, total RNA was harvested and subjected to qRT-PCR. A 60% knockdown (KD) of smp_138030 abundance is detected in worms treated with siSmp_138030 compared to worms treated with siLuc. In Panel B, five worm pairs for each treatment (siLuc and siSmp_138030) were cultivated for 7 days post treatment in an atmosphere of 5% $CO_2$ with a 70% media exchange performed every 24 hrs. Quantification of worm movement was performed using WormassayGP2 on the 7th day, wherein the lower the score, the lower the worm movement ($p<0.001$). Panel C shows daily worm movement of the siRNA treated worms (data at day 3, $p<0.01$; data at days 4 through 7; $p<0.001$).

Panels D and E (FIG. 4) show egg production at 48 and 168 hrs after introduction of siRNAs 48 hr data, $p<0.01$; 168 hr data, $p<0.001$). Panel F shows the RNAi-mediated knockdown of smp_138030 contains 9% less H3K4 methylation. Following RNAi-induced Smp_138030 knockdown, total histone extracts from RNAi targeted worms (siSmp_138030) and control worms (siLuc) were analysed for H3K4 methylation. A slight decrease (9%) in H3K4 methylation is found in siSmp_138030 treated worms. This data also supports the hypothesis that the compounds of the present invention are inhibitors of protein lysine methyl transferase enzymes.

Activity Against *Fasciola hepatica* Newly Excysted Juveniles (NEJs)

Figure 5:
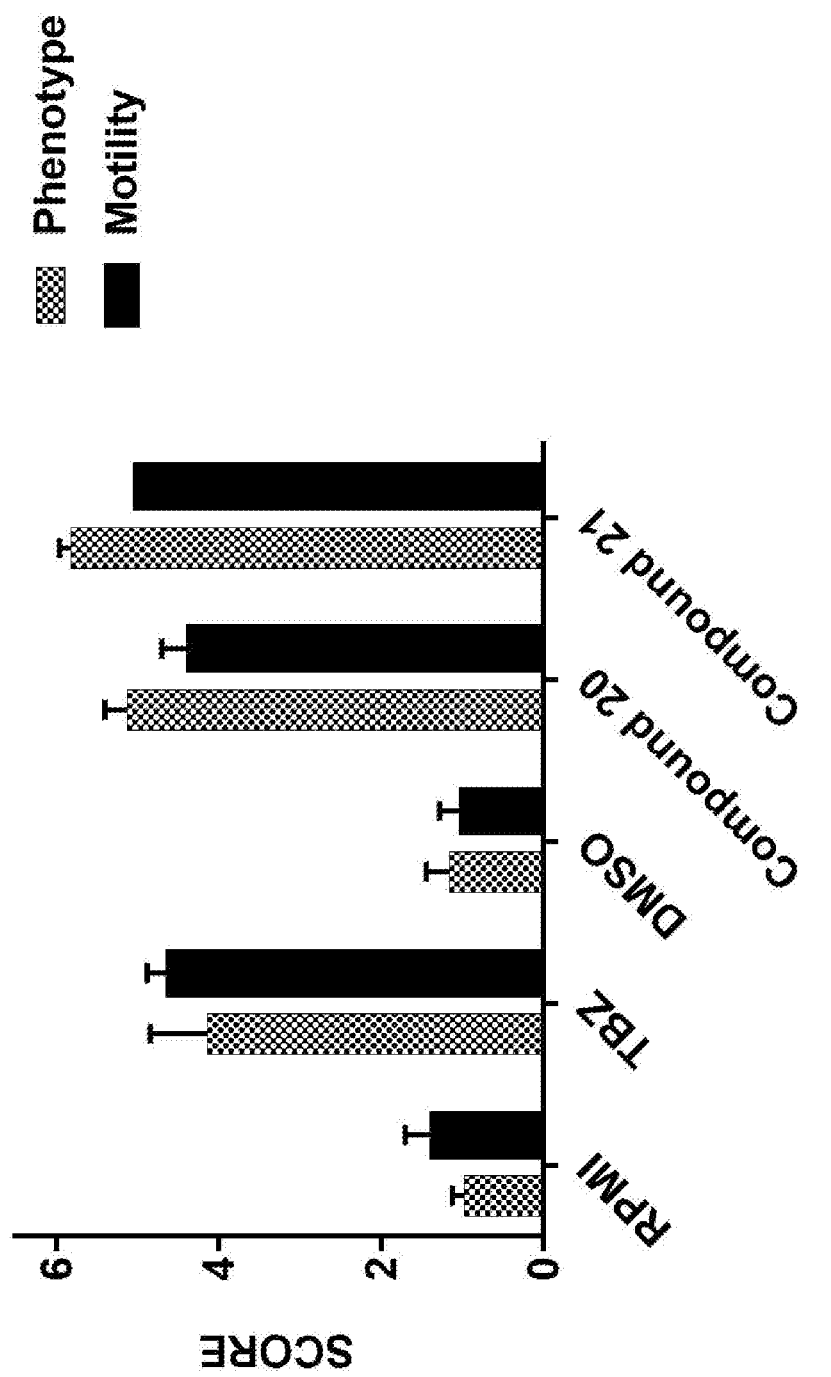
FIG. 5 shows the activity against *Fasciola hepatica* newly excysted juveniles (NEJs) of two selected compounds.

FIG. 5 shows the activity against *Fasciola hepatica* newly excysted juveniles (NEJs) of two selected compounds. *F. hepatica* NEJs (25 per well) were incubated with the three compounds at a concentration of 10 µM (in 0.1% DMSO) and cultured for 72 hrs at 37° C. in an atmosphere containing 5% $CO_2$. Control wells (25 NEJs per well) included those containing 0.1% DMSO (solvent) and RMPI (media) as negative controls or 10 µM Triclabendazole (0.1% DMSO, as positive control, labelled "Tbz" (Comp. 3). After 72 hrs, all NEJs were scored for phenotype and motility metrics. For each treatment, an average of both phenotype and motility score was calculated based on the individual parasite scores (across two independent replicates), wherein a higher score indicates lower worm activity. SD is reported on the bar chart.

Identification of Putative Smp_138030 Homologs in Other Infectious Agents.

The protein sequence of the putative target of these compounds (Smp_138030) was used as queries for protein BLAST (BLASTp) searches against the predicted protein database derived from genomes of the different species hosted in NCBI (https://blast.ncbi.nlm.nih.gov/Blast.cgi) and Wormbase-Parasite (VVormBase ParaSite—a comprehensive resource for helminth genomics. Howe K L, Bolt B J, Shafie M, Kersey P and Berriman, M. Mol Biochem Parasitol. 2017 July; 215:2-10) using default settings except for *S. aureus* where a lower threshold value and BLOSUM45 as scoring matrix was used.

Table 5 shows the identification of homologous Smp_130830 proteins in *Fasciola hepatica*, *S. japonicum*, *S. haematobium*, *P. berghei*, *Plasmodium falciparum*, *Eimeria tenella*, *Dirofilaria immitis*, *Haemonchus contortus*, *Echinococcus multilocularis* and *Staphylococcus aureus*. The data in Table 5 shows a close similarity of the Smp_130830 protein sequence of *Schistosoma mansoni* with the protein lysine methyltransferase enzymes listed therein of *F. hepatica*, *E. tenella*, *D. immitis*, *H. contortus*, *E. multilocularis* and *Plasmodium* sp, and a reasonably close similarity with the prmA protein sequence of *Staphylococcus aureus*. This data suggests that the compounds of the present invention which are considered to be inhibitors of the Smp_138030 enzyme may also be effective in combatting *F. hepatica*, *S. japonicum*, *S. haematobium*, *P. berghei*, *Plasmodium falciparum*, *E. tenella*, *D. immitis*, *H. contortus*, *E. multilocularis Plasmodium* sp and *S. aureus* due to inhibition activity of the homologous proteins identified in Table 5.

TABLE 5

| | | Closest homologue | BLAST P E value |
|---|---|---|---|
| *Plasmodium | *F. hepatica* | D915_13540 | 1.90E-176 |
| | *S. japonicum* | Sjp_0076680 | 1.50E-156 |
| | *S. haematobium* | MS3_03745 | 0.00E+00 |
| | *P. berghei* | PBANKA_112850 | 5.00E-25 |
| | *P. falciparum* 3D7 | PF3D7_0629700 | 3.00E-25 |
| | *P. falciparum* 7G8 | Pf7G8_060034700 | 3.00E-25 |
| | *P. falciparum* CD01 | PfCD01_060035100 | 3.00E-25 |
| | *P. falciparum* Dd2 | PfDd2_060034400 | 3.00E-25 |
| | *P. falciparum* GA01 | PfGA01_060034700 | 3.00E-25 |
| | *P. falciparum* GB4 | PfGB4_060034200 | 3.00E-25 |
| | *P. falciparum* GN01 | PfGN01_060035400 | 3.00E-25 |
| | *P. falciparum* HB3 | PfHB3_060033900 | 3.00E-25 |
| | *P. falciparum* IT | PfIT_060033500 | 3.00E-25 |
| | *P. falciparum* KE01 | PfKE01_060035800 | 3.00E-25 |
| | *P. falciparum* KH01 | PfKH01_060036700 | 3.00E-25 |
| | *P. falciparum* KH02 | PfKH02_060036200 | 3.00E-25 |
| | *P. falciparum* ML01 | PfML01_060033500 | 3.00E-25 |
| | *P. falciparum* SD01 | PfSD01_060033600 | 3.00E-25 |
| | *P. falciparum* SN01 | PfSN01_060034500 | 3.00E-25 |
| | *P. falciparum* TG01 | PfTG01_060035000 | 3.00E-25 |
| *S. aureus | | prmA | 5.60E-03 |
| *Eimeria tenella (Houghton Strain, PRJEB4863) | | CDJ39082 | 5.00E-30 |
| *Dirofilaria immitis* (PRJEB1797) | | nDi.2.2.2.t05252 | 1.90E-39 |
| *Haemonchus contortus* (PRJEB506) | | HCON_00084150 | 1.10E-33 |
| *Echinococcus multilocularis* (PRJEB122) | | EmuJ_000993000 | 3.20E-135 |
| *Toxoplasma gondii* (PRJNA80767) | | KFG45293 | 3.00E-34 |

*NCBI BlastP

**WormBase Parasite BlastP

ADME Data

Table 6 shows ADME data for compounds 4, 9, 11, 12 and 18 compared to the known control compounds listed. This data was obtained using the methods described by Cyprotex (https://www.cyprotex.com/admepk), the CRO that conducted these assays.

This data shows that most of the tested compounds bind strongly to plasma protein constituents. Furthermore, the metabolic stability (in mouse liver microsomes) of most of the tested compounds is classified as medium (between 9 and 48 µL/min/mg protein). Finally, most of the compounds are partially soluble (between 1 µM and 100 µM)

TABLE 6

|  | | Plasma protein binding fu (± SD) | Metabolic stability** | | | Semi thermo-dynamic solubility | |
|---|---|---|---|---|---|---|---|
|  | | | $CL_{int}$ (μL/min/mg protein) | SE | $t_{1/2}$ (min) | Mean solubility (μM) | SD |
| Control | | 0.0727 ± 0.00131 (Warfarin) | 457 (Diazepam) 58.3 (Diphenhydramine) | 4.21 4.24 | 4.21 4.24 | 35.4 (Nicardipine) >100 (Warfarin) | 4.74 NA |
| Compound | 4 | ND | 9.18 | 1.11 | 151 | 12.7 | 2.85 |
|  | 9 | ND | 16 | 2.66 | 86.9 | 6.95 | 1.59 |
|  | 11 | ND | 0.134 | 4.63 | 10300 | 32.8 | 6.51 |
|  | 12 | 0.0134* | 10.8 | 3.93 | 128 | 4.09 | 1.02 |
|  | 18 | ND | 37.4 | 1.4 | 37.1 | 15.5 | 3.38 |

ND—could not be determined
*Compound detected in one out of the three replicates
NA—not applicable
SE—Standard error
SD—Standard deviation
$CL_{int}$—Intrinsic clearance
**Species = Mouse, SubstrateConc = 1 μM
fu—fraction of drug unbound in plasma Mouse Pharmacokinetics Compounds 1, 7, 12, 4, 9, 11 and 18 were formulated as follows: 0.25 mg/mL in 10% DMSO, 20% Cremophor EL, 70% water (clear solution). Non-compartmental mouse pharmacokinetics (Male C57/BL6 Mouse, Fasted; 3 mice per group) were determined after oral administration of a nominal dose of 2.5 mg/kg of these formulations in cassettes (5 compounds/group) according to the protocols employed by WuXi (https://www.wuxiapptec.com; the CRO that conducted these studies).

The results are shown in Table 7 below.

TABLE 7

| PK parameters | Compound | | | | | | |
|---|---|---|---|---|---|---|---|
|  | 1 | 7 | 12 | 4 | 9 | 11 | 18 |
| $C_{max}$ (ng/mL) | 22.57 | 21.25 | 20.10 | 90.43 | 79.27 | 68.83 | 16.45 |
| $T_{max}$ (h) | 4.00 | 4.00 | 4.00 | 3.33 | 4.00 | 4.00 | 4.00 |
| $T_{1/2}$ (h) | ND | ND | ND | ND | ND | 3.74 | ND |
| $T_{last}$ (h) | 8.00 | ND | ND | 8.00 | 8.00 | ND | ND |
| $AUC_{0-last}$ (ng · h/mL) | 98.93 | 89.60 | 77.80 | 436.33 | 337.33 | 419.00 | 68.20 |
| $AUC_{0-inf}$ (ng · h/mL) | ND | ND | ND | ND | ND | 444.50 | ND |
| $MRT_{0-last}$ (h) | 4.89 | 4.75 | 4.76 | 4.25 | 4.22 | 6.50 | 3.86 |
| $MRT_{0-inf}$ (h) | ND | ND | ND | ND | ND | 7.84 | ND |
| $AUC_{Extra}$ (%) | ND | ND | ND | ND | ND | 1.82 | ND |
| $AUMC_{Extra}$ (%) | ND | ND | ND | ND | ND | 6.77 | ND |

The results in Table 7 show a similar plasma-profile for these compounds as the maximum blood concentration of each compound was observed about 3-4 hours ($T_{max}$) post-dosing (e.g. a rapid onset of each compound in the blood stream). Most interestingly, mice dosed with a single dose of compounds 4, 9 and 11 presented a higher Cmax and $AUC_{0-last}$ compared to the other compounds (1, 7 and 12). Collectively all the compounds are effective for a few hours after dosing as the observed $T_{last}$ (when detectable) is 8 hours post-dosing.

Anti-Schistosomal in vivo Efficacy Screen

Figure 6B:
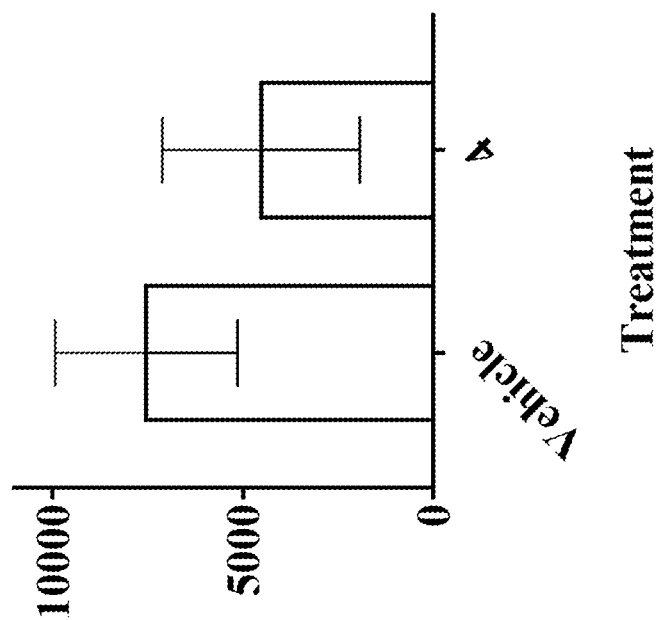
Figure 6A:
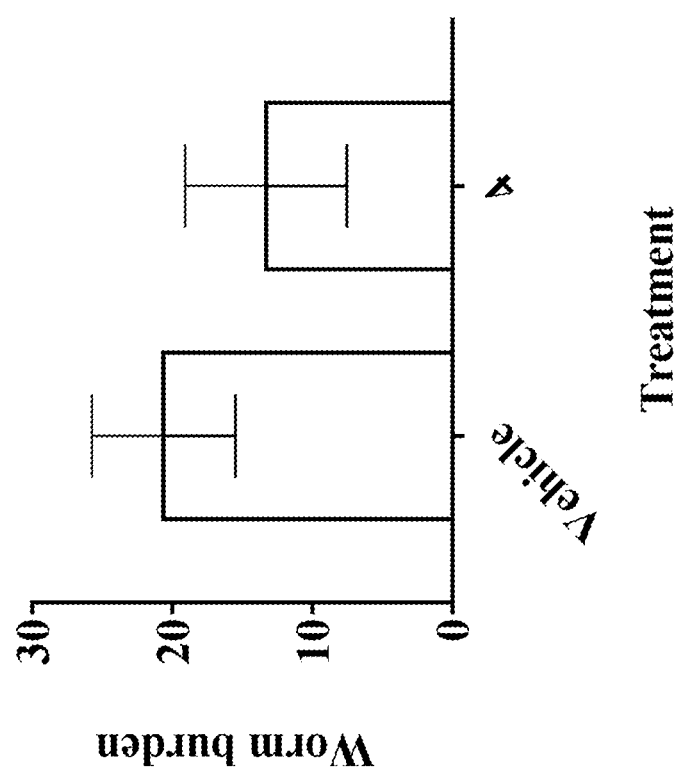

FIGS. 6a and 6b show the in vivo worm burden and egg count results, respectively, for compound 4 obtained using the anti-schistosomal in vivo efficacy method described earlier. The vehicle used was 10% DMSO, 20% Cremophor EL and 70% water. A 100 mg/kg oral dose of Compound 4 was used. Two doses were administered—100 mg/kg at day 1 and day 3. The charts of FIGS. 6a and 6b show that Compound 4 induced a 35.5% and a 39.9% reduction in worm burden and egg count in vivo, respectively, compared to the vehicle.

These results indicate that compound 4 partially reduces worm and egg burdens in an experimental murine model of schistosomiasis.

In summary, the present invention provides compounds of formula (I), or pharmaceutically acceptable salts or solvates thereof, for use in the treatment of a patient infected with pathogenic organisms;

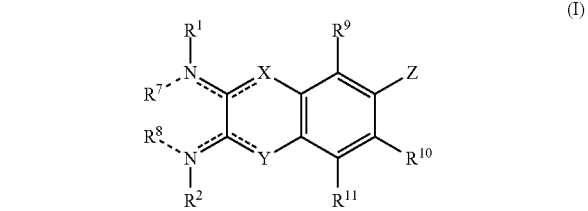

(I)

wherein X and Y are each independently selected from C, N, O and S, provided at least one of X and Y is N, O or S; wherein $R^1$ and $R^2$ are each independently selected from an optionally substituted $C_1$-$C_8$ alkyl, $C_1$-$C_8$ alkenyl, aryl, heteroaryl or alkylaryl group; and wherein Z is selected from H, —CN, —NO$_2$, —NR$^3$R$^4$, —NR$^5$(CO)R$^6$; $C_1$-$C_4$ alkyl, $C_1$-$C_4$ alkoxy, —(CO)WR$^{12}$, hydroxy, amino, thiol, chloro, fluoro, CF$_3$, CHF$_2$ or CH$_2$F groups. The compounds may be effective in treating patients infected with parasites selected from schistosome, *Fasciola* or *Plasmodium* parasites. Additionally or alternatively, the compounds of formula (I) may be effective in treating patients infected with pathogenic bacteria selected from *S. aureus* and MRSA.

The following definitions apply to the terms as used throughout this specification, unless otherwise limited in specific instances.

As used herein, the term "alkyl" means both straight and branched chain saturated hydrocarbon groups. Examples of alkyl groups include methyl, ethyl, n-propyl, iso-propyl, n-butyl, t-butyl, i-butyl, and sec-butyl groups. Furthermore, the term alkyl encompasses cyclic hydrocarbon groups, for example cyclopropyl, cylcobutyl, cyclopentyl, cyclohexyl groups etc.

As used herein, the term "aryl" means a carbocyclic aromatic system containing one, two or three rings wherein such rings may be attached together in a pendent manner or may be fused. The term "aryl" embraces aromatic radicals such as benzyl, phenyl, naphthyl, anthracenyl, phenanthryl, indanyl, indenyl, annulenyl, azulenyl, tetrahydronaphthyl, and biphenyl.

As used herein, the term "heteroaryl" as used herein refers to 3 to 7 membered, preferably 5 to 7 membered, unsaturated heteromonocyclic rings, or fused polycyclic rings in which at least one of the fused rings is unsaturated, wherein at least one atom is selected from the group consisting of O, S, and N. The term also embraces fused polycyclic groups wherein heterocyclic radicals are fused with aryl radicals, wherein heteroaryl radicals are fused with other heteroaryl radicals, or wherein heteroaryl radicals are fused with cycloalkyl radicals. Examples of heteroaryl groups include pyrrolyl, pyrrolinyl, imidazolyl, pyrazolyl, pyridyl, pyrimidinyl, pyrazinyl, pyridazinyl, triazolyl, pyranyl, furyl, thienyl, oxazolyl, isoxazolyl, oxadiazolyl, thiazolyl, thiadiazolyl, isothiazolyl, indolyl, isoindolyl, indolizinyl, benzimidazolyl, quinolyl, isoquinolyl, quinoxalinyl, quinazolinyl, indazolyl, benzotriazolyl, benzodioxolyl, benzopyranyl, benzoxazolyl, benzoxadiazolyl, benzothiazolyl, benzothiadiazolyl, benzofuryl, benzothienyl, chromonyl, coumarinyl, benzopyranyl, tetrahydroquinolinyl, tetrazolopyridazinyl, tetrahydroisoquinolinyl, thienopyridinyl, furopyridinyl, pyrrolopyridinyl and the like. Exemplary tricyclic heterocyclic groups include carbazolyl, benzidolyl, phenanthrolinyl, dibenzofuranyl, acridinyl, phenanthridinyl, xanthenyl and the like.

As used herein, the term "cycloalkyl" means a cyclic saturated hydrocarbon group. Examples of cycloalkyl groups include cyclopropyl, cyclobutyl, cyclopentyl and cyclohexyl.

As used herein, the term "halogen" or "halo" means fluorine, chlorine, bromine or iodine. Fluorine and chlorine are particularly preferred.

"Pharmaceutically acceptable salt" means a salt such as those described in standard texts on salt formation, see for example: P. Stahl, et al., Handbook of Pharmaceutical Salts: Properties, Selection and Use (VCHA/VVNey-VCH, 2002), or S. M. Berge, et al., "Pharmaceutical Salts" (1977) Journal of Pharmaceutical Sciences, 66, 1-19. Suitable salts according to the invention include those formed with organic or inorganic acids or bases. In particular, suitable salts formed with acids according to the invention include those formed with mineral acids, strong organic carboxylic acids, such as alkanecarboxylic acids of 1 to 4 carbon atoms which are unsubstituted or substituted, for example, by halogen, such as saturated or unsaturated dicarboxylic acids, such as hydroxycarboxylic acids, such as amino acids, or with organic sulfonic acids, such as $C_1$-$C_4$ alkyl- or aryl-sulfonic acids which are unsubstituted or substituted, for example by halogen. Pharmaceutically acceptable acid addition salts include those formed from hydrochloric, hydrobromic, sulphuric, nitric, citric, tartaric, acetic, phosphoric, lactic, pyruvic, acetic, trifluoroacetic, succinic, perchloric, fumaric, maleic, glycolic, lactic, salicylic, oxaloacetic, methanesulfonic, ethanesulfonic, p-toluenesulfonic, formic, benzoic, malonic, naphthalene-2-sulfonic, benzenesulfonic, isethionic, ascorbic, malic, phthalic, aspartic, and glutamic acids, lysine and arginine. Other acids, which may or may not in themselves be pharmaceutically acceptable, may be useful as intermediates in obtaining the compounds of the invention and their pharmaceutical acceptable acid addition salts.

Pharmaceutically acceptable base salts include ammonium salts, alkali metal salts, for example those of potassium and sodium, alkaline earth metal salts, for example those of calcium and magnesium, and salts with organic bases, for example dicyclohexylamine, N-methyl-D-glucomine, morpholine, thiomorpholine, piperidine, pyrrolidine, a mono-, di- or tri-lower alkylamine, for example ethyl-, tert-butyl-, diethyl-, diisopropyl-, triethyl-, tributyl- or dimethyl-propylamine, or a mono-, di- or trihydroxy lower alkylamine, for example mono-, di- or triethanolamine. Corresponding internal salts may furthermore be formed.

"Pharmaceutically acceptable solvate" means a molecular complex comprising the compound of the invention and one or more pharmaceutically acceptable solvent molecules, for example, water or ethanol. Those skilled in the art of organic chemistry will appreciate that many organic compounds can form complexes with solvents in which they are reacted or from which they are precipitated or crystallized. These complexes are known as "solvates". For example, a complex with water is known as a "hydrate". Solvates, such as hydrates, exist when the drug substance incorporates solvent such as water, in the crystal lattice in either stoichiometric or non-stoichiometric amounts. Drug substances are routinely screened for the existence of hydrates since these may be encountered at any stage of the drug manufacturing process or upon storage of the drug substance or dosage form. Solvates are described in S. Byrn et al., Pharmaceutical Research, 1995. 12(7): p. 954-954, and Water-Insoluble Drug Formulation, 2nd ed. R. Liu, CRC Press, page 553, which are incorporated herein by reference.

"Therapy", "treatment" and "treating" include both preventative and curative treatment of a condition, disease or disorder. It also includes slowing, interrupting, controlling or stopping the progression of a condition, disease or disorder. It also includes preventing, curing, slowing, interrupting, controlling or stopping the symptoms of a condition, disease or disorder.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

For the avoidance of doubt, wherein amounts of components in a composition are described in wt %, this means the weight percentage of the specified component in relation to the whole composition referred to.

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A method of treating a patient infected with parasites selected from schistosome, *Fasciola*, or *Plasmodium* parasites and/or a patient infected pathogenic bacteria selected from *S. aureus*, MRSA and *Enterococcus faecalis*, the method comprising administering to said patient a therapeutically effective amount of a compound of formula (I), or a pharmaceutically acceptable salt or solvate thereof;

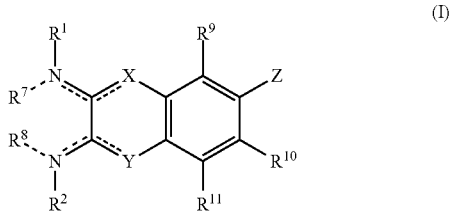

(I)

wherein X and Y are each N;
wherein $R^1$ and $R^2$ are each independently selected from a $C_1$-$C_8$ alkyl, a $C_1$-$C_8$ alkenyl, an aryl group, or an alkylaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a (CO)$OR^{13}$ or (CO)$NHR^{13}$ group wherein $R^{13}$ is selected from said groups;
wherein Z is selected from —$NO_2$, —$NR^3R^4$, or —$NR^5$(CO)$R^6$;
wherein $R^3$ and $R^4$ are each independently selected from H, a $C_1$-$C_6$ alkyl, optionally forming a ring, a $C_1$-$C_6$ alkenyl, an aryl group, or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a (CO)$OR^{14}$ or (CO)$NHR^{14}$ group wherein $R^{14}$ is selected from said groups;
wherein $R^5$ is selected from H, a $C_1$-$C_6$ alkyl or a $C_1$-$C_6$ alkenyl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;
wherein $R^6$ is selected from a $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a (CO)$OR^{15}$ or (CO)$NHR^{15}$ group wherein $R^{15}$ is selected from said groups;
wherein $R^7$ and $R^8$, when present, are each independently selected from a H or a $C_1$-$C_4$ alkyl;
wherein $R^9$, $R^{10}$ and $R^{11}$ are each independently selected from H, $C_1$-$C_4$ alkyl, $C_1$-$C_4$ alkoxy, —(CO)$WR^{12}$, hydroxy, amino, thiol, chloro, fluoro, $CF_3$, $CHF_2$ or $CH_2F$ groups;
wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

2. The method according to claim 1, wherein $R^1$ and $R^2$ are each independently selected from an aryl group or an alkylaryl group, optionally substituted with one or more of $C_1$-$C_4$ alkyl, $C_1$-$C_4$ alkoxy, OH, $NH_2$, SH, chloro, fluoro, $CF_3$, $CHF_2$ or $CH_2F$ groups.

3. The method according to claim 1, wherein the groups $R^1$ and $R^2$ are the same.

4. The method according to claim 1, wherein $R^7$ and $R^8$ are both H.

5. The method according to claim 1, wherein Z is —$NR^3R^4$ or —$NR^5$(CO)$R^6$.

6. The method according to claim 5, wherein Z is —$NR^3R^4$ and wherein $R^3$ and $R^4$ are independently selected from H, a $C_1$-$C_6$ alkyl, optionally forming a ring, optionally substituted with one or more of $C_1$-$C_2$ alkoxy, F, Cl and $CF_3$ groups.

7. The method according to claim 5, wherein Z is $NR^5$(CO)$R^6$, wherein $R^5$ is H or methyl; wherein $R^6$ is selected from a $C_1$-$C_6$ alkyl, or an aryl group, optionally substituted with one or more of $C_1$-$C_2$ alkyl, $C_1$-$C_2$ alkoxy, F, Cl or $CF_3$ groups.

8. The method according to claim 1, wherein the pathogenic organisms which the patient is infected with are parasites selected from schistosome, *Fasciola* or *Plasmodium* parasites.

9. The method according to claim 1, wherein the pathogenic organisms which the patient is infected with are pathogenic bacteria selected from *S. aureus*, MRSA and *Enterococcus faecalis*.

10. A method of treating a patient infected with parasites selected from schistosome, *Fasciola*, or *Plasmodium* parasites and/or a patient infected pathogenic bacteria selected from *S. aureus*, MRSA and *Enterococcus faecalis*, the method comprising administering to said patient a therapeutically effective amount of a compound of formula (III), or a pharmaceutically acceptable salt or solvate thereof;

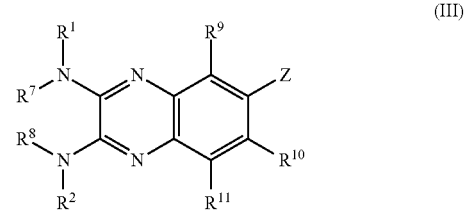

(III)

wherein $R^1$ and $R^2$ are independently selected from a $C_1$-$C_8$ alkyl, a $C_1$-$C_8$ alkenyl, an aryl group or an alkylaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, fluoro, chloro, $CF_3$, $CHF_2$ or $CH_2F$ groups;
wherein Z is selected from —$NR^3R^4$ or —$NR^5$ (CO) $R^6$;
wherein $R^3$ and $R^4$ are each independently selected from H, a $C_1$-$C_6$ alkyl, optionally forming a ring, a $C_1$-$C_6$ alkenyl, an aryl group, or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;
wherein $R^5$ is selected from H, a $C_1$-$C_6$ alkyl or a $C_1$-$C_6$ alkenyl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;
wherein $R^6$ is selected from a $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^7$ and $R^8$ are each independently selected from a H or a $C_1$-$C_4$ alkyl;

wherein $R^9$, $R^{10}$ and $R^{11}$ are each independently selected from H, $C_1$-$C_4$ alkyl, $C_1$-$C_4$ alkoxy, —(CO)$WR^{12}$, hydroxy, amino, thiol, chloro, fluoro, $CF_3$, $CHF_2$ or $CH_2F$ groups;

wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

11. The method according to claim 10, wherein $R^1$ and $R^2$ are independently selected from an aryl group or an alkylaryl group, optionally substituted with one or more of $C_1$-$C_4$ alkoxy, chloro, fluoro, $CF_3$, $CHF_2$ or $CH_2F$ groups.

12. The method according to claim 10, wherein the compound is a medicament.

13. A method for disinfecting parasites selected from schistosome, *Fasciola*, or *Plasmodium* parasites and/or a patient infected pathogenic bacteria selected from *S. aureus*, MRSA and *Enterococcus faecalis* from a surface, the method comprising the step of applying, to a surface, a compound according to of formula (I), or a pharmaceutically acceptable salt or solvate thereof;

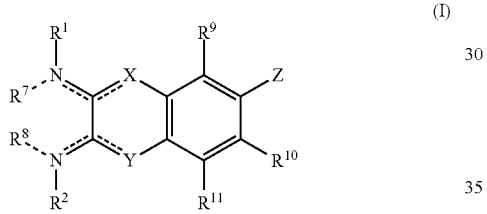

(I)

wherein X and Y are each N;

wherein $R^1$ and $R^2$ are each independently selected from a $C_1$-$C_8$ alkyl, a $C_1$-$C_8$ alkenyl, an aryl group, an alkylaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a (CO)$OR^{13}$ or (CO)$NHR^{13}$ group wherein $R^{13}$ is selected from said groups;

wherein Z is selected from —$NO_2$, —$NR^3R^4$, or —$NR^5(CO)R^6$;

wherein $R^3$ and $R^4$ are each independently selected from H, a $C_1$-$C_6$ alkyl, optionally forming a ring, a $C_1$-$C_6$ alkenyl, an aryl group, or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a (CO)$OR^{14}$ or (CO)$NHR^{14}$ group wherein $R^{14}$ is selected from said groups;

wherein $R^5$ is selected from H, a $C_1$-$C_6$ alkyl or a $C_1$-$C_6$ alkenyl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups;

wherein $R^6$ is selected from a $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups; or a (CO)$OR^{15}$ or (CO)$NHR^{15}$ group wherein $R^{15}$ is selected from said groups;

wherein $R^7$ and $R^8$, when present, are each independently selected from a H or a $C_1$-$C_4$ alkyl;

wherein $R^9$, $R^{10}$ and $R^{11}$ are each independently selected from H, $C_1$-$C_4$ alkyl, $C_1$-$C_4$ alkoxy, —(CO)$WR^{12}$, hydroxy, amino, thiol, chloro, fluoro, $CF_3$, $CHF_2$ or $CH_2F$ groups;

wherein W is a bond, N or O and wherein $R^{12}$ is selected from $C_1$-$C_6$ alkyl, a $C_1$-$C_6$ alkenyl, an aryl or a heteroaryl group, optionally substituted with one or more of $C_1$-$C_4$ alkyl, $C_1$-$C_4$ alkoxy, $C_1$-$C_4$ alkylamino, $C_1$-$C_4$ alkylthio, hydroxy, amino, thiol, chloro, fluoro, $CF_3$, $CHF_2$ or $CH_2F$ groups.

* * * * *